(12) United States Patent
Zhang et al.

(10) Patent No.: US 10,956,714 B2
(45) Date of Patent: Mar. 23, 2021

(54) METHOD AND APPARATUS FOR DETECTING LIVING BODY, ELECTRONIC DEVICE, AND STORAGE MEDIUM

(71) Applicant: BEIJING SENSETIME TECHNOLOGY DEVELOPMENT CO., LTD, Beijing (CN)

(72) Inventors: Rui Zhang, Beijing (CN); Kai Yang, Beijing (CN); Tianpeng Bao, Beijing (CN); Liwei Wu, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 65 days.

(21) Appl. No.: 16/236,265

(22) Filed: Dec. 28, 2018

(65) Prior Publication Data

US 2019/0354746 A1 Nov. 21, 2019

Related U.S. Application Data

(63) Continuation of application No. PCT/CN2018/115500, filed on Nov. 14, 2018.

(30) Foreign Application Priority Data

May 18, 2018 (CN) .......................... 201810481863.3

(51) Int. Cl.
*G06K 9/00* (2006.01)
*H04N 1/00* (2006.01)

(52) U.S. Cl.
CPC ..... *G06K 9/00248* (2013.01); *G06K 9/00255* (2013.01); *G06K 9/00268* (2013.01); *H04N 1/00336* (2013.01)

(58) Field of Classification Search
CPC .......... G06K 9/00248; G06K 9/00268; G06K 9/00255; G06K 2209/40; G06K 9/00281;
(Continued)

(56) References Cited

U.S. PATENT DOCUMENTS

2015/0063704 A1* 3/2015 Tobinai .............. G06K 9/00281
382/195
2015/0193649 A1 7/2015 Shor et al.

FOREIGN PATENT DOCUMENTS

CN 102622588 A 8/2012
CN 103530599 A 1/2014
(Continued)

OTHER PUBLICATIONS

Machine translation for CN 105023010, IDS (Year: 2015).*
(Continued)

*Primary Examiner* — Qian Yang
(74) *Attorney, Agent, or Firm* — Syncoda LLC; Feng Ma

(57) ABSTRACT

A method and apparatus for detecting a living body, an electronic device and a storage medium include: performing target object detection on a first image captured by a first image sensor in a binocular camera apparatus to obtain a first target region, and performing the target object detection on a second image captured by a second image sensor in the binocular camera apparatus to obtain a second target region; obtaining key point depth information of a target object according to the first target region and the second target region; and determining, based on the key point depth information of the target object, whether the target object is a living body.

17 Claims, 13 Drawing Sheets

(58) Field of Classification Search
CPC . G06K 9/00906; H04N 1/00336; G06T 7/593
See application file for complete search history.

(56) References Cited

FOREIGN PATENT DOCUMENTS

| | | |
|---|---|---|
| CN | 103886301 A | 6/2014 |
| CN | 104615997 A | 5/2015 |
| CN | 105023010 A | 11/2015 |
| CN | 105205458 A | 12/2015 |
| CN | 105335722 A | 2/2016 |
| CN | 105354557 A | 2/2016 |
| CN | 205563614 U | 9/2016 |
| CN | 106897675 A | 6/2017 |
| CN | 107358181 A | 11/2017 |
| CN | 108229279 A | 6/2018 |
| CN | 108764091 A | 11/2018 |
| JP | 2003178306 A | 6/2003 |
| JP | 2006099614 A | 4/2006 |
| WO | 2016107638 A1 | 7/2016 |

OTHER PUBLICATIONS

International Search Report in the international application No. PCT/CN2018/115500, dated Feb. 25, 2019.
First Office Action of the Chinese Application No. 201810481863.3, dated May 6, 2020.
First Office Action of the Japanese application No. 2019-565559, dated Nov. 4, 2020.

\* cited by examiner

METHOD AND APPARATUS FOR DETECTING LIVING BODY, ELECTRONIC DEVICE, AND STORAGE MEDIUM

CROSS-REFERENCE TO RELATED APPLICATION

This is a continuation application of International Patent Application No. filed on PCT/CN2018/115500 filed on Nov. 14, 2018, which claims priority to Chinese Patent Application No. 201810481863.3 filed on May 18, 2018. The disclosures of these applications are incorporated herein by reference in their entireties.

TECHNICAL FIELD

Embodiments of this disclosure relate to the technical field of living-body detection, and in particular, to a method and an apparatus for detecting a living body, an electronic device, and a storage medium.

BACKGROUND

Living-body detection is an important issue in the field of information security. How to determine whether an object to be detected is from an image of a real living body or of a fake object is an important research topic in living-body detection technologies. Conventional living-body detection technologies include interactive solutions and solutions in combination with external information. The interactive solutions have high requirements for a system, are complex in implementation, and provide poor user experience. While the solutions in combination with external information have low accuracy, it is easy to fake an object.

SUMMARY

Embodiments of this disclosure provide technical solutions for living-body detection.

According to one aspect of the embodiments of this disclosure, a method for detecting a living body provided includes:

performing target object detection on a first image captured by a first image sensor in a binocular camera apparatus to obtain a first target region, and performing the target object detection on a second image captured by a second image sensor in the binocular camera apparatus to obtain a second target region; obtaining key point depth information of a target object according to the first target region and the second target region; and determining, based on the key point depth information of the target object, whether the target object is a living body.

In some embodiments, the obtaining key point depth information of the target object according to the first target region and the second target region includes: performing key point detection on the first target region to obtain key point information of the first target region, and performing the key point detection on the second target region to obtain key point information of the second target region; and determining key point depth information of the target object according to the key point information of the first target region and the key point information of the second target region.

In some embodiment, the determining, based on the key point depth information of the target object, whether the target object is a living body includes: determining depth dispersion based on the key point depth information of the target object; and determining, according to the depth dispersion, whether the target object is a living body.

In some embodiments, the method further includes: determining whether the first target region is consistent with the second target region; the obtaining key point depth information of the target object according to the first target region and the second target region includes: obtaining, in response to determining that the first target region is consistent with the second target region, key point depth information of the target object according to the first target region and the second target region.

In some embodiment, the determining whether the first target region is consistent with the second target region includes: searching a database for a first search result corresponding to the first target region; searching the database for a second search result corresponding to the second target region; and determining, based on the first search result and the second search result, whether the first target region is consistent with the second target region.

In some embodiments, the determining whether the first target region is consistent with the second target region includes: determining a similarity between the first target region and the second target region; and determining, based on the similarity, whether the first target region is consistent with the second target region.

In some embodiments, the method further includes: obtaining a corrected second target region based on the first target region in response to determining that the first target region is inconsistent with the second target region; the obtaining key point depth information of the target object according to the first target region and the second target region includes: obtaining key point depth information of the target object according to the first target region and the corrected second target region.

In some embodiments, the obtaining the corrected second target region based on the first target region includes: determining a corresponding region of the first target region in the second image; and determining the corresponding region as the corrected second target region.

In some embodiments, the determining the corresponding region of the first target region in the second image includes: determining a key region in the first target region according to the key point information of the first target region; and determining the corresponding region of the first target target region in the second image based on the key region.

In some embodiments, the determining the key region in the first target region according to the key point information of the first target region includes: determining, based on the key point information of the first target region, a smallest region enclosed by at least one key point in the first target region; and amplifying the smallest region by a preset number of times to obtain the key region.

In some embodiments, the determining the corresponding region of the first target region in the second image includes: mapping the at least one key point in the first target region to the second image to obtain mapping position information of the at least one key point in the second image; and determining the corresponding region of the first target region in the second image according to the mapping position information of the at least one key point in the second image.

In some embodiments, the method further includes: determining whether fake information exists in the first image and the second image in response to determining, based on the key point depth information of the target object, that the target object is a living body; and determining, based on whether fake information exists in the first image and the second image, whether the target object is a living body.

In some embodiments, the fake information includes one or any combination of the following information: edge information, light reflection information, and material information of an imaging medium; edge information, light reflection information, and Moire pattern information of a display screen; and mask information, sculpture information, and model information.

In some embodiments, the determining whether fake information exists in the first image and the second image includes: performing feature extraction processing on the first image and the second image separately to obtain first feature data and second feature data; and determining, based on the first feature data and the second feature data, whether fake information exists in the first image and the second image.

In some embodiments, the determining, based on the first feature data and the second feature data, whether fake information exists in the first image and the second image includes: performing fusion processing on the first feature data and the second feature data to obtain fusion features; and determining, based on the fusion features, whether fake information exists in the first image and the second image.

In some embodiments, the first feature data or the second feature data includes one or any combination of the following: local binary pattern features, histogram-of-sparse-code features, color features, global features, regional features, and detail features.

In some embodiments, the method further includes: determining whether the first image and the second image satisfy a frame selection condition; the obtaining key point depth information of the target object according to the first target region and the second target region includes: obtaining, in response to determining that the first image and the second image satisfy the frame selection condition, key point depth information of the target object according to the first target region and the second target region.

In some embodiments, the frame selection condition includes one or any combination of the following conditions: the target object is detected in both the first image and the second image; the target object detected in the first image is located in a set region of the first image and the target object detected in the second image is located in a set region of the second image; completeness of the target object detected in the first image and completeness of the target object detected in the second image satisfy a preset condition; a proportion, in the first image, of the target object detected in the first image is greater than a proportion threshold and a proportion, in the second image, of the target object detected in the second image is greater than the proportion threshold; clarity of the first image and clarity of the second image both are greater than a clarity threshold; and exposure of the first image and exposure of the second image both are greater than an exposure threshold.

In some embodiments, the method further includes: determining whether a next image pair in a video stream satisfies a frame selection condition in response to determining that at least one of the first image or the second image does not satisfy the frame selection condition; and determining the video stream as a fake video stream in response to determining that no image pair satisfying the frame selection condition is found from the video stream within a preset time period or within a preset number of image pairs.

In some embodiments, the first image sensor or the second image sensor includes one of the following cameras: a visible light camera, a near-infrared camera, and a dual-channel camera.

In some embodiments, the method further includes: pre-processing at least one of the first image and the second image, where the pre-processing includes one or any combination of the following: image type adjustment, size adjustment, z-score normalization processing, and brightness adjustment.

The performing the target object detection on the first image captured by the first image sensor to obtain the first target region, and the performing the target object detection on the second image captured by the second image sensor to obtain the second target region includes: performing the target object detection on the first image pre-processed to obtain the first target region, and performing the target object detection on the second image pre-processed to obtain the second target region.

In some embodiments, the target object is a human face.

According to one aspect of the embodiments of this disclosure, an apparatus for detecting a living body provided includes: a processor; and a memory for storing instructions executable by the processor, wherein execution of the instructions by the processor causes the processor to perform the method in any embodiment above.

In some embodiments, the apparatus further includes the binocular camera apparatus including the first image sensor and the second image sensor, wherein the first image sensor is configured to capture the first image and the second image sensor is configure to capture the second image.

According to one aspect of the embodiments of this disclosure, a non-transitory computer-readable storage medium provided has computer program instructions stored thereon, wherein execution of the computer program instructions by a processor causes the processor to implement the method in any embodiment above.

In the embodiments of this disclosure, the depth information of the respective key points of the target object is obtained according to the first target region and the second target region, which are respectively detected from the first image captured by the first image sensor of the binocular camera apparatus and the second image captured the second image sensor of the binocular camera apparatus, and whether the target object is a living body is determined according to the depth information of the key points. According to the embodiments of this disclosure, living-body detection of the target object can be implemented by using the images captured by the binocular camera apparatus without using interactive and external information, which has simple implementation, wide application range, and accurate detection result.

The other features and aspects of this disclosure are clearer according to the detailed descriptions of the exemplary embodiments with the following accompanying drawings.

BRIEF DESCRIPTION OF THE DRAWINGS

The accompanying drawings, which are included in the specification and constitute a part of the specification, illustrate the exemplary embodiments, features, and aspects of this disclosure in conjunction with the specification, and are used for explaining the principles of the embodiments of this disclosure.

DETAILED DESCRIPTION

Figure 1:
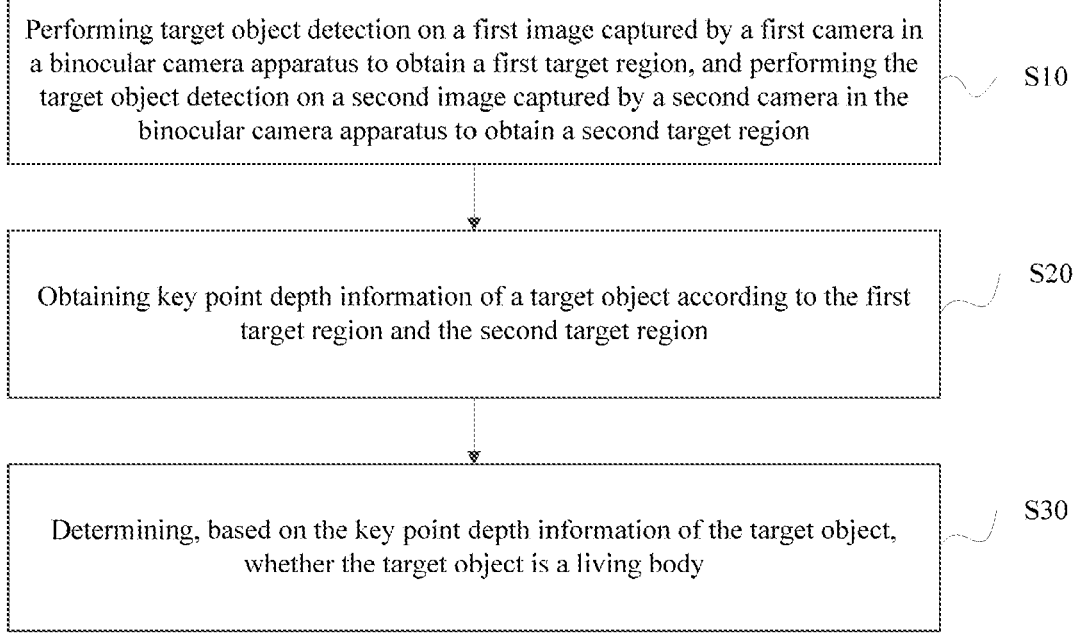
FIG. 1 is an exemplary flowchart of a method for detecting a living body according to embodiments of this disclosure.

The various exemplary embodiments, features, and aspects of this disclosure are described below in detail with reference to the accompanying drawings. A same reference character in the accompanying drawings represents elements having the same or similar functions. Although the various aspects of the embodiments are illustrated in the accompanying drawings, unless stated particularly, the accompanying drawings are not drawn in proportion. A dedicated term "exemplary" herein means "used as an example, an embodiment, or description". Any embodiment described as "exemplary" herein is not construed to be preferred to or better than other embodiment. In addition, in order to better describe the embodiments of this disclosure, numerous specific details are provided in specific implementations below. A person skilled in the art should understand that the embodiments of this disclosure can also be implemented even if there is no certain specific detail. In some embodiments, the methods, means, elements and circuits well known to a person skilled in the art are not described in detail, so as to emphasize the substance of the embodiments of this disclosure.

FIG. 1 is an exemplary flowchart of a method for detecting a living body according to embodiments of this disclosure.

In step S10, target object detection is performed on a first image captured by a first image sensor in a binocular camera apparatus, to obtain a first target region, and the target object detection is performed on a second image captured by a second image sensor in the binocular camera apparatus, to obtain a second target region.

In some embodiments, the binocular camera apparatus includes two calibrated cameras. The two cameras in the binocular camera apparatus are referred to as the first image sensor and the second image sensor. The first image sensor and the second image sensor are the same type of cameras, or are different types of cameras. The type of the camera includes a visible light camera, a near-infrared camera, a dual-channel camera, etc. In some embodiments, the first image sensor or the second image sensor includes one of the following cameras: a visible light camera, a near-infrared camera, and a dual-channel camera. Alternatively, the cameras in the embodiments of this disclosure are other types of cameras. The specific types of the cameras are not limited herein.

The visible light camera is a camera forming an image by shining an object by visible light. The near-infrared camera is a camera forming an image by irradiating an object by using near-infrared light. The dual-channel camera is a camera forming an image by using a dual-channel imaging principle, wherein the dual-channel includes a red (R) channel. Descriptions are made by taking an RGB model as an example, and other color model are also be used. The two cameras in the binocular camera apparatus are the same type of cameras, or are different types of cameras. For example, the two cameras in a binocular camera apparatus A are both visible light cameras; the two cameras in a binocular camera apparatus B are a visible light camera and a near-infrared camera respectively; the two cameras in a binocular camera apparatus C are a visible light camera and a dual-channel camera respectively; the two cameras in a binocular camera apparatus D are both dual-channel cameras. A binocular camera apparatus equipped with different types of cameras may be selected according to the requirements for living-body detection. The types of the two cameras in the binocular camera apparatus may be selected according to requirements, which has a broader application range and is easier to be expanded.

In some embodiments, the first image sensor and the second image sensor may capture a pair of static images, or, the first image sensor and the second image sensor capture a continuous video stream, and then a pair of image frames is selected from the captured video stream. Accordingly, the first image and the second image are static images or video image frames, and no limitation is made thereto in the embodiments of this disclosure.

In the embodiments of this disclosure, the target object detection is performed separately on the first image captured by the first image sensor and on the second image captured by the second image sensor. Target object detection is performed on the first image and the second image by using technologies such as image recognition. Alternatively, the first image and the second image are input to a neural network to perform the target object detection.

The target object includes various living-body objects or specified parts of a living-body object. For example, the target object is a person or an animal, or the target object is a human face, a hand, or a face of an animal. The target region includes a region in which the target object is located in the first image or the second image.

In some embodiments, the target object is a human face, and the first target region and the second target region are face regions or face boxes.

In step S20, key point depth information of the target object is obtained according to the first target region and the second target region.

In some embodiments, key point detection may be performed on the first target region and the second target region, to obtain position information of the key points of the target object in the first image and of the target object in the second image. The key points include points at specified positions on the target object. For example, if the target object is a human face, the points at the positions of the human face, such as the inner canthi, outer canthi, and pupil of the eye, the nose tip, the glabella, the inner end of the eyebrow, the outer end of the eyebrow and the like, may serve as the key points of the human face according to requirements. The number of the key points may be set according to requirements. For example, N key points in the human face may be determined, where N>2. The key point depth information of the target object may be obtained according to the first coordinates of the key points in the first target region and the second coordinates of the key points in the second target region, i.e., the key point information of the first target region and the key point information of the second target region, as well as to the parameters of the binocular camera apparatus. In some embodiments, the parameters of the binocular camera apparatus include the focal length and/or the distance between the centers of the two cameras, or include other parameters, and no limitation is made thereto in the embodiments of this disclosure.

In step S30, whether the target object is a living body is determined based on the key point depth information of the target object.

In some embodiments, if the target object captured by the binocular camera apparatus is a living body, the distances from the respective key points on the living body to the binocular camera apparatus are different. For example, if a living-body face faces the binocular camera apparatus, the distance between the nose tip and the binocular camera apparatus is less than the distance between the ears and the binocular camera apparatus. However, if the target object is a picture of a human face, rather than a living body, the depths of the respective key points are equal.

In the embodiments of this disclosure, the depth information of the key points of the target object is obtained according to the first target region, that is detected from the first image captured by the first image sensor of the binocular camera apparatus, and to the second target region that is detected from the second image captured by the second image sensor of the binocular camera apparatus, and whether the target object is a living body is determined according to the depth information of the key points. According to the embodiments of this disclosure, the living-body detection of the target object can be implemented by using the images captured by the binocular camera apparatus without using interactive and external information, which has simple implementation, wide application range, and accurate detection result.

Figure 2:
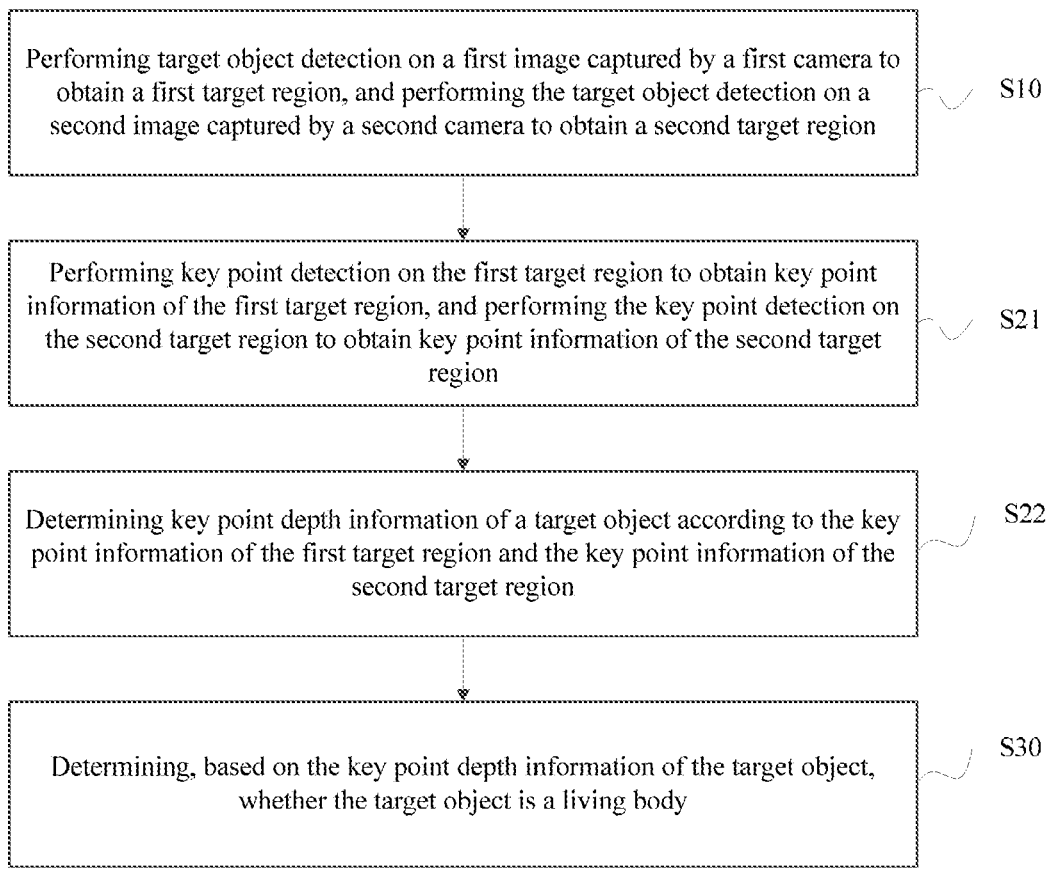
FIG. 2 is an exemplary flowchart of step S20 in the method for detecting a living body according to embodiments of this disclosure.

FIG. 2 is an exemplary flowchart of step S20 in the method for detecting a living body according to embodiments of this disclosure.

In step S21, key point detection is performed on the first target region to obtain key point information of the first target region, and the key point detection is performed on the second target region to obtain key point information of the second target region.

In some embodiments, the image of the first target region and the image of the second target region may be separately input to a neural network to perform key point detection, so as to obtain key point information of the first target region and key point information of the second target region. The key point information includes plane coordinate information of the key points in the first image or of the key points in the second image.

In step S22, key point depth information of the target object is determined according to the key point information of the first target region and the key point information of the second target region.

In some embodiments, depth information of the key points may be obtained by using the plane coordinate information of the key points in the first image or the plane coordinate information of the key points in the second image.

For example, to obtain the depth information of the key points, cameras are calibrated first. The left camera in the binocular camera apparatus is determined as a first camera, and the right camera in the binocular camera apparatus is determined as a second camera. An intrinsic parameter M1 of the left camera, an intrinsic parameter M2 of the right camera, and an extrinsic parameter of the left and right cameras, [R, T], are obtained.

RL and RR represent extrinsic parameter rotation matrices of the left and right cameras respectively, and TL and TR represent translation matrices of the left and right cameras respectively. [R, T] represents a position relationship of the right camera with respect to the left camera, and the left camera is not moved with respect to its own position. The parameters are represented by the following formulas (1-1) and (1-2):

$$R_L = \begin{pmatrix} 1 & 0 & 0 \\ 0 & 1 & 0 \\ 0 & 0 & 1 \end{pmatrix}, T_L = (0\ 0\ 0); \qquad (1\text{-}1)$$

$$R_R = R,\ T_R = T. \qquad (1\text{-}2)$$

If the target object is a human face, the coordinates of the key points of the human face in the images of the human face, that are simultaneously captured by the calibrated left and right cameras, are determined. The obtained coordinate values of the key points of the human face in the pixel coordinate system of images captured by the left and right cameras are $P_L$ and $P_R$ respectively. The coordinate values of the key points of the human face in the left camera coordinate system, i.e., $P_W=(X_W\ Y_W\ Z_W\ 1)$, are calculated according to the above known information, and the coordinate values of the key points of the human face in the right camera coordinate system are set as $P_W$, where for the calculation formulas of $P_L$, $P_R$ and, $P_W$, reference is made to formulas (1-3), (1-4), and (1-5) respectively:

$$P_L = sM_L P_W \qquad (1\text{-}3);$$

$$P_R = dM_R P_W \qquad (1\text{-}4);$$

$$P_W = [R,T]P_W \qquad (1\text{-}5).$$

Formula (1-5) is expanded to obtain formula (1-6):

$$P_R = d/s\ M_R[R,T]M_L^{-1}P_L \qquad (1\text{-}6),$$

where PR, PL, MR, ML, and [R, T] are all known, and according to the formula above, d and s can be deduced, where d is a conversion coefficient of the world coordinate system with respect to the left camera, and s is a conversion coefficient of the world coordinate system with respect to the right camera. Finally, the coordinate values $P_W$ of the key points of the human face in the left camera coordinate system are obtained according to the following formula (1-7):

$$P_W = 1/s\, M_L^{-1} P_L \quad (1\text{-}7),$$

where $Z_W$ is depth information of the key points in the human face.

It should be noted that, by comparing the variance of the depth information of the key points with a set threshold, the human face is determined to be a real human face or a fake 2 dimensions (D) or 2.5D human face on the basis of the distribution of the key points of the human face. If the variance is greater than the threshold, the output detection result indicates that the target object is a living body, and if the variance is less than the threshold, the output detection result indicates that the target object is a fake object. In addition, in other embodiment, except the variance, the statistics such as the Euclidean distance and/or the like may be compared with a preset threshold, so as to obtain a detection result.

In the embodiments of this disclosure, the key points are detected in the first target region and the second target region to obtain the coordinates of the key points in the first image and the second image respectively, and the depth information of the key points is calculated according to the coordinates of the key points in the first image and the second image. The depth information of the key points of the target object can be conveniently and accurately calculated by using the images captured by the binocular camera apparatus, and the living-body detection of the target object can be implemented without using interactive and external information, thereby having a high detection efficiency, wide application range, and accurate detection result.

Figure 3:
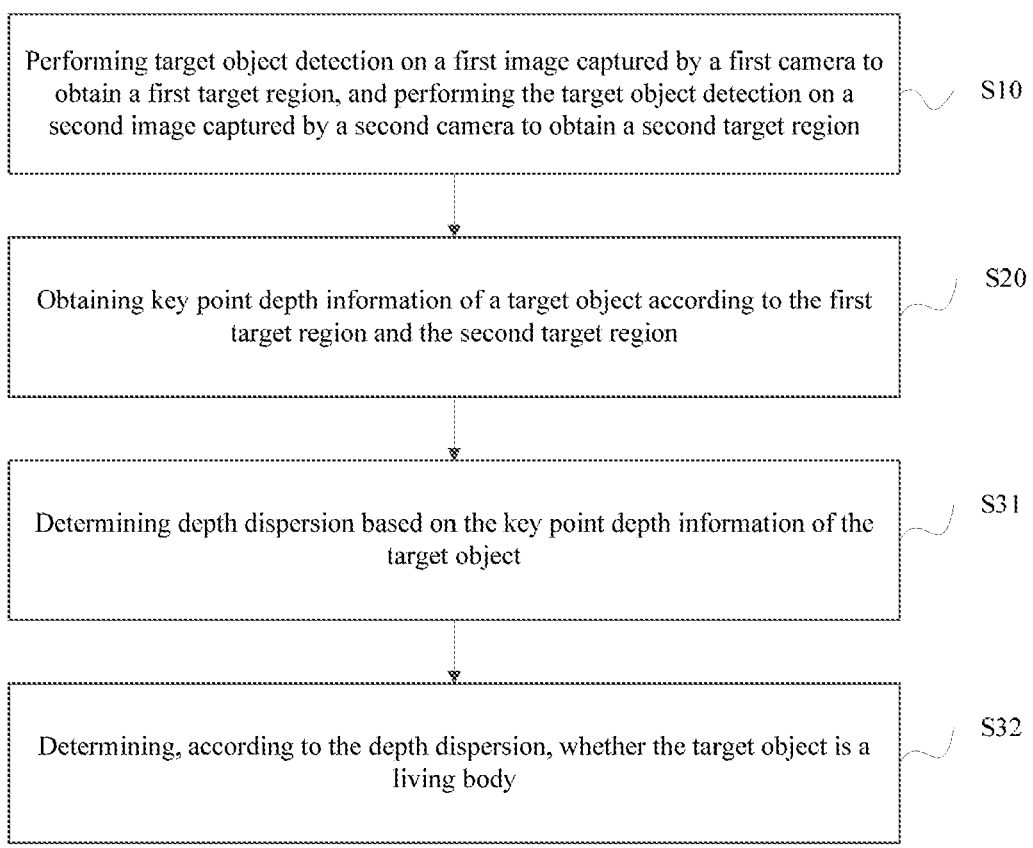
FIG. 3 is an exemplary flowchart of step S30 in the method for detecting a living body according to embodiments of this disclosure.

FIG. 3 is an exemplary flowchart of step S30 in the method for detecting a living body according to embodiments of this disclosure.

In step S31, depth dispersion is determined based on the key point depth information of the target object.

In some embodiments, calculating the depth dispersion of the depth information of the key points includes calculating the variance, standard deviation, etc. of the depth information of the key points, and no limitation is made thereto in the embodiments of this disclosure.

In step S32, whether the target object is a living body is determined according to the depth dispersion.

In some embodiments, the calculated depth dispersion is compared with a dispersion threshold, and whether the target object in the first target region and the second target region is a living body is determined on the basis of the comparison result. For example, if the calculated depth dispersion of the key points is less than the set dispersion threshold, it is considered that the distances from the key points in the first target region and the second target region to the binocular camera apparatus are similar, which does not satisfy the distribution characteristics of the distances between the key points of a living body and the binocular camera apparatus. In the embodiments of this disclosure, whether the target object in the first target region and the second target region is a living body is determined according to the depth dispersion of the depth information of the key points. The living-body detection can be implemented by using the depth dispersion calculated based on the depth information of key points, without using interactive and external information, thereby having a high detection efficiency, wide application range, and accurate detection result.

Figure 4:
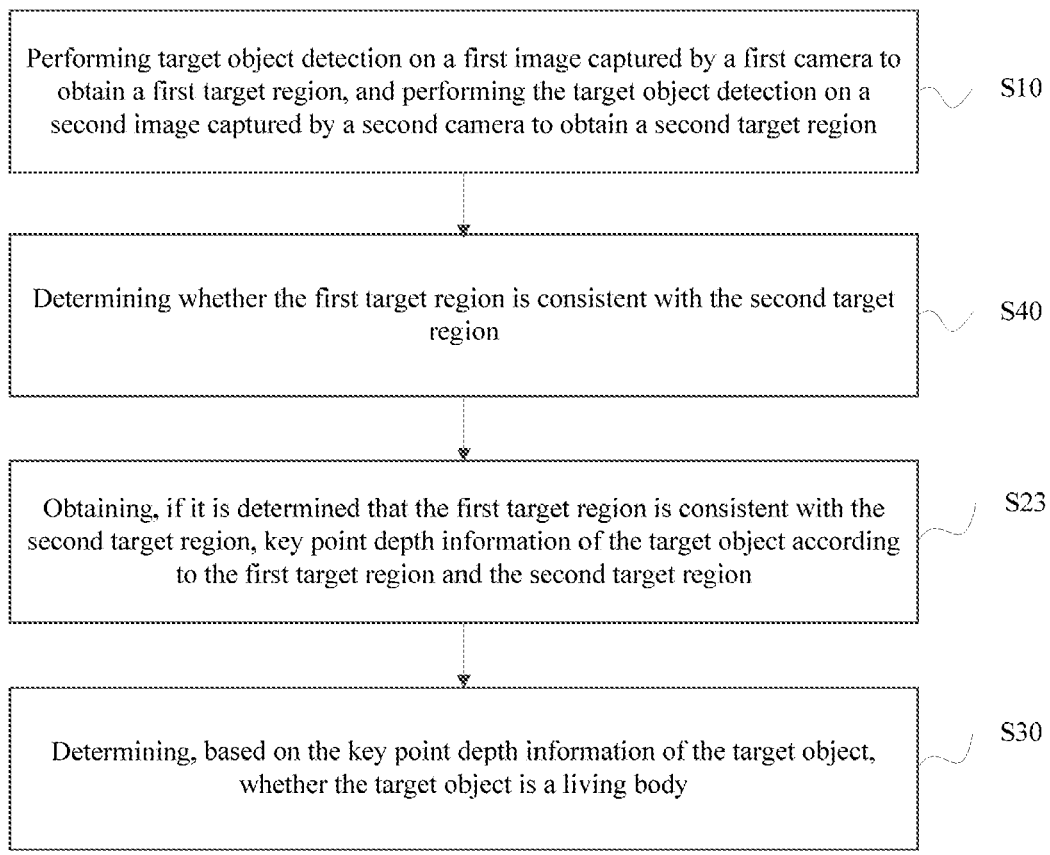
FIG. 4 is another exemplary flowchart of the method for detecting a living body according to embodiments of this disclosure.

FIG. 4 is another exemplary flowchart of the method for detecting a living body according to embodiments of this disclosure.

In step S40, whether the first target region is consistent with the second target region is determined.

Step S20 includes step S23. In step 23, if it is determined that the first target region is consistent with the second target region, key point depth information of the target object is obtained according to the first target region and the second target region.

In some embodiments, if there are a plurality of photographed objects within the photography range of the binocular camera apparatus, the first image and the second image may simultaneously include images of the plurality of photographed objects. When the target object detection is performed on the first image and the second image, it is possible to detect a photographed object A from the first image, i.e., the first target region is an image region in which the photographed object A is located, while a photographed object B is detected from the second image, i.e., the second target region is an image region in which the photographed object B is located, it is impossible to obtain accurate living-body detection results if subsequent living-body detection steps are performed based on the above first target region and the second target region. By detecting the consistency between the first target region and the second target region, the case that the first target region and the second target region do not include the same photographed object may be excluded. By using an image recognition technology, the features in the first target region and the second target region are extracted separately, and the features extracted from the two regions are compared to detect the consistency between the first target region and the second target region. Alternatively, the first target region and the second target region are compared with a set third target region, to detect the consistency between the first target region and the second target region, and no limitation is made thereto in the embodiments of this disclosure.

In the embodiments of this disclosure, by determining the consistency between the first target region and the second target region, the accuracy of the living-body detection result of the target object is ensured.

In some embodiments, in the method for detecting a living body, it is determined whether the first target region is consistent with the second target region includes:

searching a database for a first search result corresponding to the first target region;

searching the database for a second search result corresponding to the second target region; and determining, based on the first search result and the second search result, whether the first target region is consistent with the second target region.

In some embodiments, the two steps of obtaining the first search result and the second search result are executed simultaneously, or executed in any order, and no limitation is made thereto in the embodiments of this disclosure.

In some embodiments, the database includes images of a plurality of target objects to be retrieved. The database is established according to a preset number of collected images of target objects. The database is searched for a first search result corresponding to the first target region. The first search result is a retrieved image of a target object, or is an analysis result obtained according to the retrieved image of the target object.

If the first search result is a retrieved image of the target object, the first search result is an image of the target object to be retrieved that completely correspond to the first target region, or is an image of the target object to be retrieved which is most similar to the first target region according to a set comparison standard. If the first search result is an analysis result obtained according to the retrieved image of the target object, the first search result is a difference between preset features of the retrieved image of the target object and features of the first target region. The database is searched for a second search result corresponding to the second target region, which is the same as the case that the database is searched for a first search result corresponding to the first target region, and details are not described repeatedly. If the first search result is consistent with the second search result, it is determined that the first target region is consistent with the second target region. If the first search result is inconsistent with the second search result, it is determined that the first target region is inconsistent with the second target region.

In the embodiments, the database is searched for the first target region and the second target region, and the consistency between the first target region and the second target region are determined by determining the consistency between the search results. By searching the database, whether the first target region is consistent with the second target region is determined by means of simple search and comparison, thereby having a simple determining process and high operating efficiency.

In some embodiments, in the method for detecting a living body, it is determined whether the first target region is consistent with the second target region includes: determining a similarity between the first target region and the second target region. Whether the first target region is consistent with the second target region is determined based on the similarity.

In some embodiments, the similarity between the first target region and the second target region is determined according to the whole or a specific part of the first target region and the second target region. For example, if the target object is a human face, the similarity between the first target region and the second target region is determined according to the nose region in the first target region and the second target region.

The features of the first target region and the second target region are respectively extracted for comparison, and the similarity between the first target region and the second target region is determined according to the extracted features. For example, if the target object is a human face, a first distance between the nose tip and the pupils in the first target region and in the second target region, and a second distance between the nose tip and the inner canthi in the first target region and in the second target region are calculated respectively, and the similarity between the first target region and the second target region is determined according to the two calculated distances. The similarity between the first target region and the second target region is compared with a similarity threshold. If the similarity between the first target region and the second target region is less than the similarity threshold, it is determined that the first target region is inconsistent with the second target region. The similarity threshold may be adjusted according to requirements.

In the embodiments of this disclosure, whether a first face is consistent with a second face is determined according to the similarity between the first target region and the second target region, without using external information, which is simple and convenient.

Figure 5:
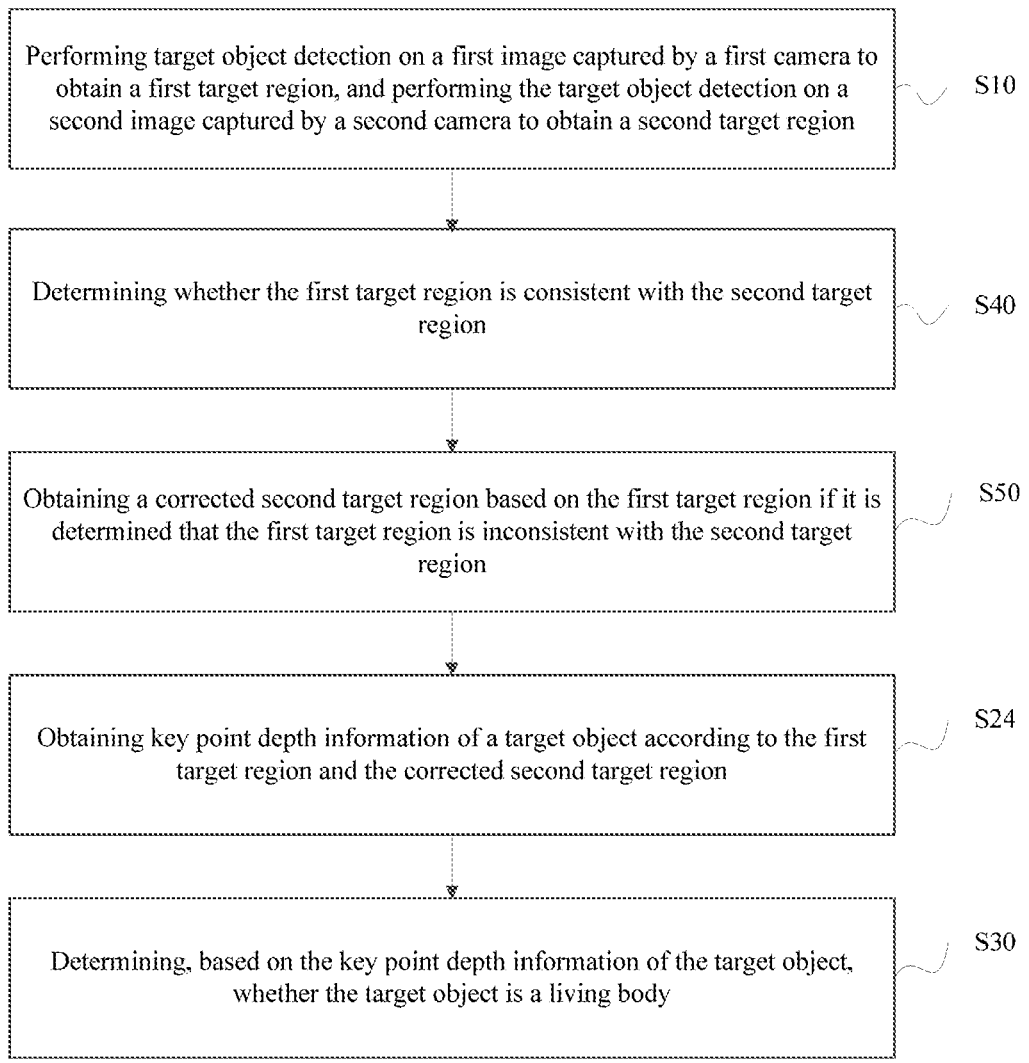
FIG. 5 is another exemplary flowchart of the method for detecting a living body according to embodiments of this disclosure.

FIG. 5 is another exemplary flowchart of the method for detecting living body according to embodiments of this disclosure.

In step S50, if it is determined that the first target region is inconsistent with the second target region, the corrected second target region is obtained based on the first target region.

In some embodiments, to avoid the problem of an inaccurate result of the subsequent living-body detection of the target object caused by the inconsistency between the first target region and the second target region, the corrected second target region is obtained based on the first target region if the first target region is inconsistent with the second target region, and the corrected second target region is consistent with the first target region. For example, target object detection is performed again on the second image according to the target object in the first target region to obtain the second target region.

Step S20 includes step S24, in which key point depth information of the target object is obtained according to the first target region and the corrected second target region.

In some embodiments, the corrected second target region is consistent with the first target region. Key point depth information of the same target object is obtained according to the first target region and the corrected second target region.

In the embodiments of this disclosure, the corrected second target region is obtained based on the first target region if the first target region is inconsistent with the second target region. The key point depth information, obtained according to the first target region and the corrected second target region, is used for obtaining an accurate living-body detection result of the target object.

In some embodiments, in the method for detecting a living body, obtaining the corrected second target region based on the first target region includes: determining a corresponding region of the first target region in the second image, and determining the corresponding region as the corrected second target region.

In some embodiments, the corresponding region of the first target region in the second image is determined according to the position of the first target region in the first image. For example, if the position of the first target region in the first image is a region enclosed by a line connecting six coordinates from A1 to A6, then a region enclosed by a line connecting six coordinates from A1 to A6 in the second image is determined as the corresponding region of the first target region. In some embodiments, the position of the corresponding region in the second image is the same as the position of the first target region in the first image, and it is considered that the target object in the corresponding region is the same as the target object in the first target region, and the corresponding region is the corrected second target region. In these embodiments, according to the position of the first target region in the first image, the corresponding region in the second image is determined to obtain the corrected second target region, which is simple and reliable.

In some embodiments, in the method for detecting a living body, determining the corresponding region of the first target region in the second image includes:

determining a key region in the first target region according to the key point information of the first target region; and determining the corresponding region of the first target region in the second image based on the key region.

In some embodiments, the key region in the first target region is determined according to key point information of all or some of the key points in the first target region. For example, the key region in the first target region is determined according to the coordinates of all the key points in the first target region, where all the key points are located in the key region. The key region is a region of any shape.

In some embodiments, the corresponding region of the first target region in the second image is determined according to the position information of the key region in the first image. For example, the corresponding region in the second image is determined according to the coordinate information of the boundary of the key region. In the embodiments, the key region is determined according to the key point information in the first target region, and then the corresponding region in the second image is determined according to the key region. The corrected second target region is obtained according to the corresponding region obtained based on the key points, which is more accurate.

In some embodiments, in the method for detecting a living body, determining the corresponding region of the first target region in the second image includes: determining, based on the key point information of the first target region, a smallest region enclosed by at least one key point in the first target region; and amplifying the smallest region by multiple times set in advance to obtain the key region.

In some embodiments, the smallest region is enclosed by at least one key point in the first target region, and the key points are located in the smallest region or at the boundary of the smallest region. The key points required for enclosing the smallest region is determined according to requirements. In some embodiments, the smallest region is amplified by multiple times set in advance to obtain the key region, where the key region covers a bigger area. The target object detection is performed at the corresponding position in the second image according to the position of the key region in the first image to obtain the corrected second target region. In the embodiments, the smallest region is enclosed by at least one key point in the first target region, and the smallest region is amplified by multiple times set in advance to obtain the key region. The key region covers a bigger area, and the target object detection is performed on the second image according to the key region to obtain the corrected second target region, which is more accurate.

In some embodiments, in the method for detecting a living body, determining the corresponding region of the first target region in the second image includes: mapping the at least one key point in the first target region to the second image to obtain mapping position information of the at least one key point in the second image; and determining the corresponding region of the first target region in the second image according to the mapping position information of the at least one key point in the second image.

In some embodiments, at least one key point in the first target region is determined according to requirements, and the mapping position information of the key points in the second image is obtained according to the position information of the determined key points in the first image. For example, the mapping coordinate 1' of a key point 1 in the second image and the mapping coordinate 2' of a key point 2 in the second image are obtained according to the coordinate 1 of the key point 1 in the first image and the coordinate 2 of the key point 2 in the first image, respectively.

In some embodiments, the corresponding region of the first target region in the second image is determined according to the position relationship between the key points and the first target region, and to the mapping coordinates of the key points in the second image. For example, to obtain the coordinates of the key points in the first target region, cameras are calibrated first. The left camera in the binocular camera apparatus is determined as a first camera, and the right camera in the binocular camera apparatus is determined as a second camera. An intrinsic parameter $M_L$ of the left camera, an intrinsic parameter $M_R$ of the right camera, and an extrinsic parameter of the left and right cameras, [R, T], are obtained.

RL and RR represent extrinsic parameter rotation matrices of the left and right cameras respectively, and TL and TR represent translation matrices of the left and right cameras respectively. [R,T] represents a position relationship of the right camera with respect to the left camera, and the left camera is not moved with respect to its own position. The parameters are represented by the following formulas (2-1) and (2-2):

$$R_L = \begin{pmatrix} 1 & 0 & 0 \\ 0 & 1 & 0 \\ 0 & 0 & 1 \end{pmatrix}, T_L = (0 \ 0 \ 0); \quad (2\text{-}1)$$

$$R_R = R, T_R = T. \quad (2\text{-}2)$$

If the target object is a face, the images of the face simultaneously captured by the left and right cameras are obtained, on which target object detections are performed respectively, and the coordinate values of the images of the face captured by the left and right cameras in the pixel coordinate system, $P_L$ and $P_R$, are obtained respectively (referring to formulas (2-3) and (2-4)). According to the above known information, the coordinate values of the face in the left camera coordinate system, $P_W=(X_W Y_W Z_W 1)$, are calculated, and the coordinate values of the face in the right camera coordinate system are set as $P_W$ (referring to formula (2-5)):

$$P_L = sM_L P_W \quad (2\text{-}3);$$

$$P_R = dM_R P_W \quad (2\text{-}4);$$

$$P_W = [R,T]P_W \quad (2\text{-}5).$$

Formula (2-4) is expanded to obtain formula (2-6):

$$P_R = d/s \ M_R[R,T]_{ML}^{-1} P_L \quad (2\text{-}6),$$

where PR, PL, MR, ML, and [R, T] are all known, and according to the formula above, d and s can be deduced. Finally, the coordinate values PWL of the face in the left camera coordinate system are obtained according to the following formula (referring to formula 2-7):

$$P_W = 1/s \ M_L^{-1} P_L \quad (2\text{-}7).$$

The calculated coordinate values of the face in the world coordinate system, $(X_W \ Y_W \ Z_W)$, are fixed and used as known values, and then in the subsequent living-body detection, only the coordinates of the key points of the face in the left image are extracted, and the coordinates of the key points of the face detected in the left image, $(u_L, v_L, 1)^T$, are mapped to $(u_R, v_R, 1)^T$ in the right image (referring to formula (2-8)):

$$\begin{pmatrix} u_R \\ v_R \\ 1 \end{pmatrix} = sM_R[R_R, T_R]\begin{pmatrix} X_w \\ Y_w \\ Z_w \\ 1 \end{pmatrix} = sM_R[R, T][R_L, T_L]\begin{pmatrix} X_w \\ Y_w \\ Z_w \\ 1 \end{pmatrix}, \quad (2\text{-}8)$$

where [RL, TL] are obtained according to the following formula (2-9):

$$\begin{pmatrix} u_L \\ v_L \\ 1 \end{pmatrix} = sM_L[R_L, T_L] \begin{pmatrix} X_w \\ Y_w \\ Z_w \\ 1 \end{pmatrix}. \quad (2\text{-}9)$$

The face region in the right image is obtained by using the key points of the face mapped to the right image.

In the embodiments of this disclosure, the mapping position information of the key points in the second image is determined according to the position information of the key points, and the corresponding region of the first target region in the second image is determined according to the mapping position information of the key points. The manner of obtaining the corresponding region according to the mapped coordinates of the key points is more targeted, and the obtained corresponding region is more accurate.

Figure 6:
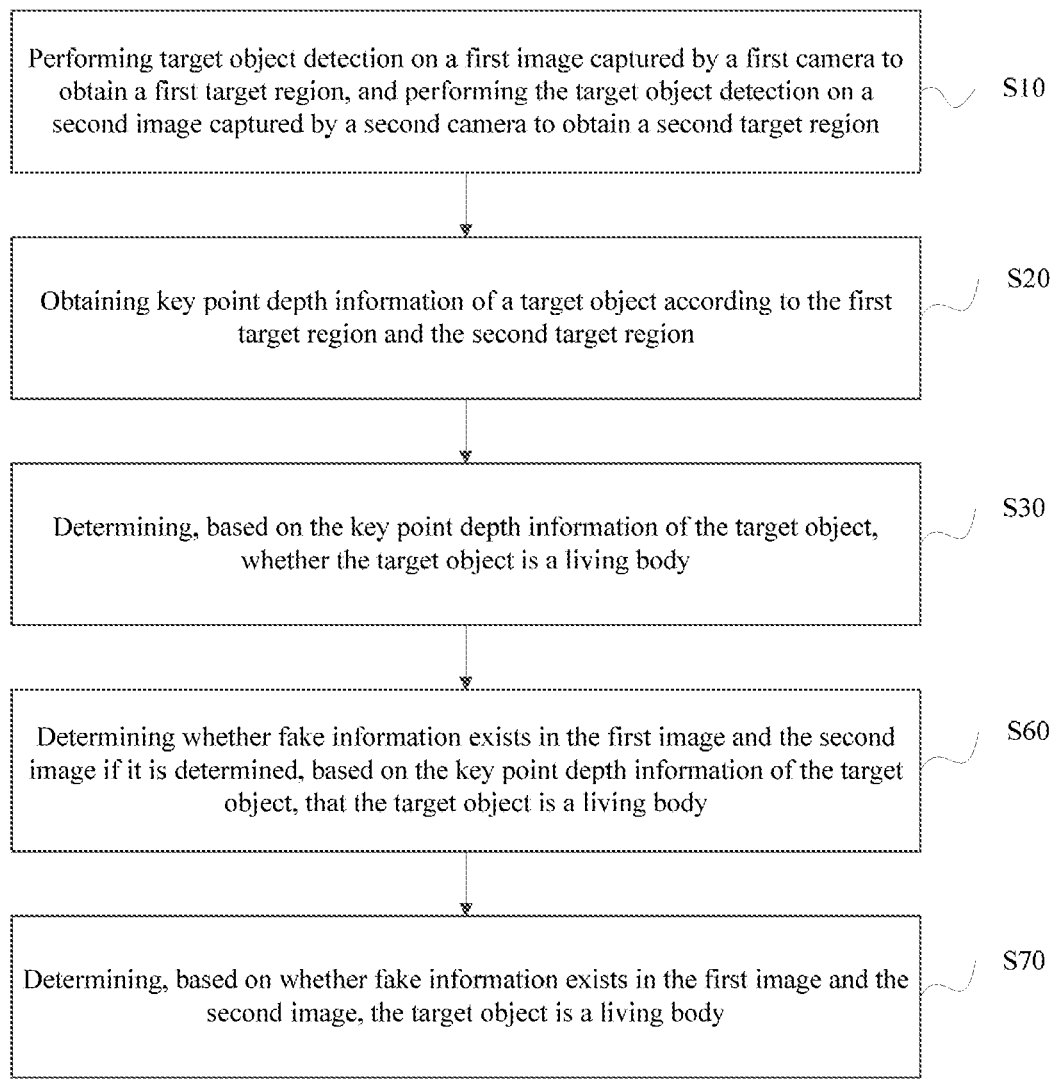
FIG. 6 is another exemplary flowchart of the method for detecting a living body according to embodiments of this disclosure.

FIG. 6 is another exemplary flowchart of the method for detecting a living body according to embodiments of this disclosure.

In step S60, whether fake information exists in the first image and the second image is determined if it is determined, based on the key point depth information of the target object, that the target object is a living body.

In some embodiments, a target object is faked by using a paper picture containing an image of the target object, by using an image of the target object captured by a smart terminal, or by using a stereo model such as a sculpture or a model. The manner of faking by using a paper picture is determined as a target-object faking manner in a first dimension, the manner of faking by using an image of the target object in a screen may be determined as a target-object faking manner in a second dimension, and the manner of faking by using a stereo model may be determined as a target-object faking manner in a third dimension. In the target-object faking manner in a first dimension, extracted information such as the edge of the paper picture, the light reflection of the paper surface, and the material of the paper is determined as fake information in a first dimension. In the target-object faking manner in a second dimension, extracted information such as the edge of the screen, the light reflection of the screen, and the Moire patterns of the screen is determined as fake information in a second dimension. In the target-object faking manner in a third dimension, extracted information such as the surface of the model (too smooth skin), the joint of the model, and the joint between the model and the target object is determined as fake information in a third dimension.

In step S70, whether the target object is a living body is determined based on whether fake information exists in the first image and the second image.

In some embodiments, if one or any combination of fake information in a first dimension, fake information in a second dimension, and fake information in a third dimension is found in the first image and/or the second image, it is determined that the target object is not a living body. If a single kind of fake information in a single dimension, an integration of multiple kinds of fake information in a single dimension, and an integration of multiple kinds of fake information in multiple dimensions are found in the first image and/or the second image, it is determined that the target object is not a living body. In the embodiments of this disclosure, whether fake information exists in the first image and/or the second image is determined, and if it is a yes, the target object is determined as a non-living body. Various kinds of fake information that is possible to exist in the first image and the second image is detected, so that the application range of living-body detection is wide and the accuracy of the living-body detection is high.

In some embodiments, the fake information includes one or any combination of the following information: edge information, light reflection information, and material information of an imaging medium; edge information, light reflection information, and Moire pattern information of a display screen; and mask information, sculpture information, and model information.

In some embodiments, the granularities of the surfaces of papers of different materials are different, the light reflection characteristics of different paper surfaces are different. The shape of the edge of the picture is regular if the target object is faked by using a paper picture. In the image obtained by photographing a paper picture by a binocular camera apparatus, it can be recognized that the target object is faked by using a paper picture according to the extracted information such as the shape of the edge of the picture, the light reflection characteristics of the paper surface, and information representing different materials by the granularity or the like.

The shape of the edge of a screen is regular, the material of the screen has light reflection characteristics different from those of a paper material, and the Moire patterns of the screen include irregular patterns generated by high-frequency interference of a photosensitive element in a device. When the target object is faked by using an image in a screen, in the image captured by photographing a screen by a binocular camera apparatus, it can be recognized that the target object is faked by using the image in the screen according to the extracted information such as the shape of the edge of the screen, the light reflection of the screen, and the Moire patterns of the screen. The stereo model includes a model, a sculpture, a mask, etc. The surface of the stereo model is generally smooth, and has no texture and grain characteristics of the real skin. A joint exists between a mask and a real face when the mask is used. When the target object is faked by using a stereo model, in the image captured by photographing the stereo model or a mask by a binocular camera apparatus, it can be recognized that the target object is faked by using a stereo model by recognizing the information on the surface or at the joint of the stereo model.

In the embodiments of this disclosure, various possible target-object faking manners can be recognized according to the fake information obtained according to the information extracted from the paper picture, the screen, or the stereo model, and the application range is wide.

Figure 7A:
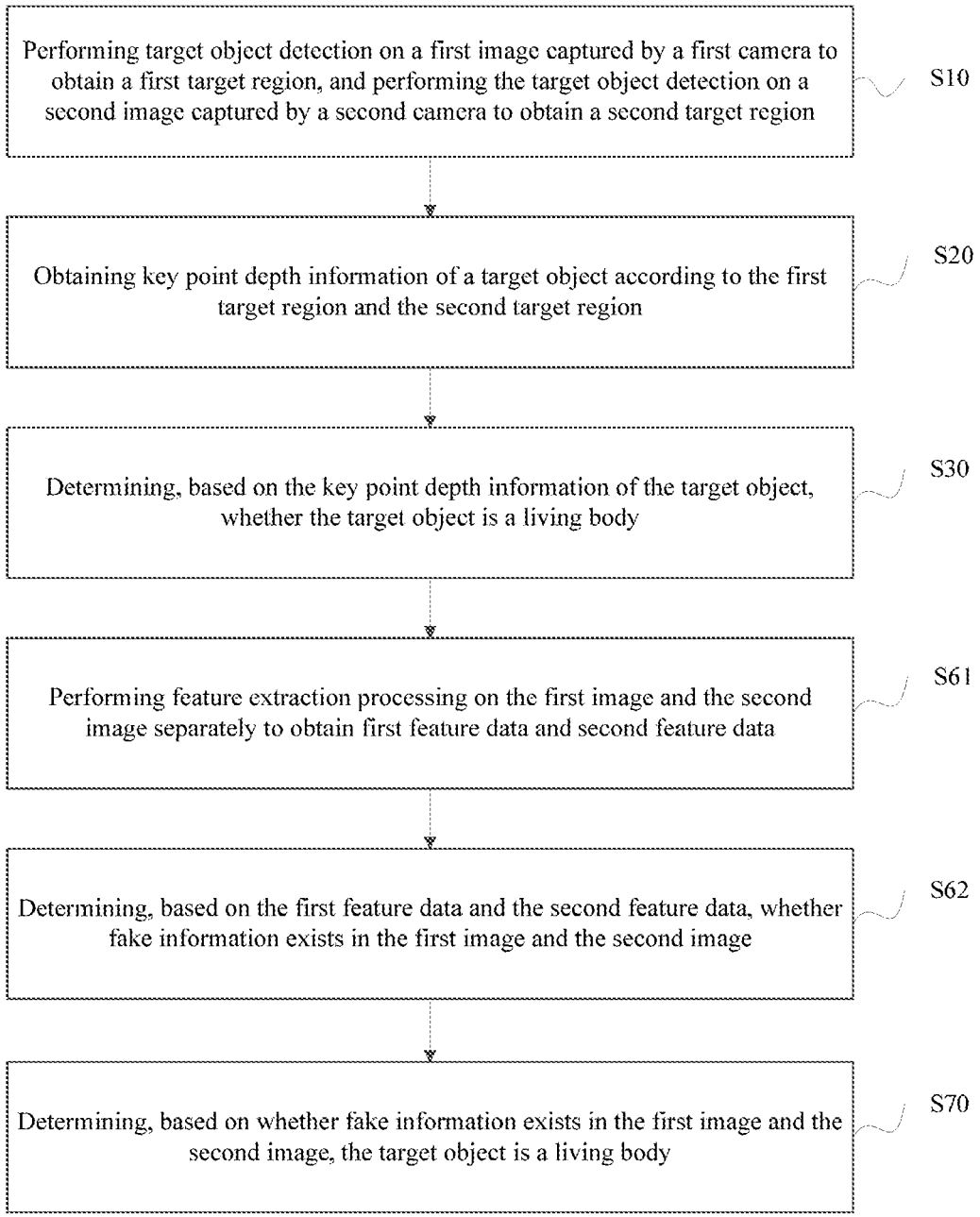
FIG. 7A is an exemplary flowchart of step S60 in the method for detecting a living body according to embodiments of this disclosure.

FIG. 7A is an exemplary flowchart of step S60 in the method for detecting a living body according to embodiments of this disclosure.

In step S61, feature extraction processing is performed on the first image and the second image separately to obtain first feature data and second feature data.

In some embodiments, first convolution processing is performed on the first image to obtain first feature data. Second convolution processing is performed on the second image to obtain second feature data. The first convolution processing is the same as or different from the second convolution processing. The parameters of the first convolution processing and the parameters of the second convolution processing are set according to requirements to obtain a first convolution processing result of the first image and a second convolution processing result of the second image.

In some embodiments, feature extraction processing is performed on the first image and the second image separately via a deep neural network, so as to obtain first feature data and second feature data. The deep neural network includes a first convolutional layer and a second convolutional layer at least, where the first convolutional layer performs first convolution processing on the first image to obtain a first convolution processing result, and the second convolutional layer performs second convolution processing on the second image to a second convolution processing result.

In some embodiments, the deep neural network includes two branches, for example, the first branch includes a plurality of first convolutional layers, and the second branch includes a plurality of second convolutional layers. The deep neural network also includes an input layer, a fully connected layer, etc. The parameters of the plurality of first convolutional layers are the same as or different from those of the plurality of second convolutional layers according to requirements. The deep neural network is trained by using a training picture set, and during training, and back propagation is performed on the deep neural network by means of a set loss function, so that a more desired output is obtained for the input of the next training through the deep neural network of which the parameters are adjusted by means of the back propagation. If a set training condition is satisfied, for example, the loss obtained according to the output reaches a certain threshold, or the training is performed a certain number of times, it is considered that the deep neural network satisfies a convergence condition, and the training is stopped to obtain the trained deep neural network.

In some embodiments, the first feature data or the second feature data includes one or any combination of the following: local binary pattern features, histogram-of-sparse-code features, color features, global features, regional features, and detail features.

The local binary pattern (LBP) features are mainly used for measuring and extracting local texture information of an image, and has characteristic of invariance for illumination. The information of the edge part in the first image or the second image, such as, for example, the edge of a paper picture and the edge of a screen, is emphasized by using the local binary model features. The histogram-of-sparse-code (HSC) features include the features of an image extracted by using a sparse coding principle, and the light reflection information and fuzzy information in the first image or the second image are reflected more obviously by using the HSC features. The color (Red, Green, and Blue (RGB)) features include features of different colors in an image, and information of different target objects in the first image or the second image, such as the shape and the outline, are extracted by using the color features. The global features of an image include features of all regions in the image, and fake information that is possible to exist in the regions in the first image or the second image is extracted based on the global features. The regional features of the image include features of a region in which the face detected in the image is located, and fake information such as the light reflection, the Moire patterns and edge of a screen in the first image or the second image is extracted based on the regional features. The detail features of an image include a set detail region or shape in the image, and fake information of different detail parts in the first image or the second image are extracted based on the detail features. For example, when the first image and the second image include fake information in a first dimension, information in the first image and the second image, such as the edge, light reflection, or material, is extracted according to image features such as local binary patterns or the histogram of sparse code, and the fake information in the first dimension in the first image and the second image, such as the edge of a paper picture, the light reflection of the paper, or the material of the paper picture, is recognized according to the extracted image information. Fake information in the first image and the second image in different faking manners is extracted more comprehensively by using different image feature methods.

In step S62, whether fake information exists in the first image and the second image is determined based on the first feature data and the second feature data.

In some embodiments, the first convolution processing result and the second convolution processing result are used for recognizing the same fake information, or used for recognizing different fake information. In some embodiments, convolution processing is performed on the first image and the second image by using the trained deep neural network, and according to the convolution processing results, fake information in multiple dimensions that are possibly included in the first image and the second image is obtained.

Various fake features in the first image and the second image can be extracted simultaneously by using the processing capability of the deep neural network according to requirements. Modeling is performed by using the strong description capability of the deep neural network, fake information in multiple dimensions can be learned by means of large-scale data training and learning without interacting with the photographed object.

In the embodiments of this disclosure, whether fake information exists in the first image and the second image is determined based on first feature data and second feature data extracted respectively from the first image and the second image. By means of the iterative update of the deep neural network, living-body detection in different situations can be implemented quickly, so that the application range is wide and the determination result is accurate.

In some embodiments, the determining, based on the first feature data and the second feature data, whether fake information exists in the first image and the second image includes:

performing fusion processing on the first feature data and the second feature data to obtain fusion features; and determining, based on the fusion features, whether fake information exists in the first image and the second image.

In some embodiments, the first convolution processing result and the second convolution processing result are in the form of a vector. Fusion processing is performed on the first convolution processing result and the second convolution processing result to obtain fusion features. The fusion features include fake information in the first image and the second image. If the first convolution processing for obtaining the first feature data is different from the second convolution processing for obtaining the second feature data, for example, the first convolution processing is performed on the fake information in a first dimension in the first image, and the second convolution processing is performed on the fake information in a second dimension in the second image. Whether fake information in a first dimension and/or a second dimension exists in the first image and the second image is determined based on the fusion features obtained by performing fusion on the first convolution processing result and the second convolution processing result. If the first convolution processing used for obtaining the first feature data is the same as the second convolution processing used for obtaining the second feature data, for example, the first convolution processing is performed on the fake information in a first dimension in the first image, and the second convolution processing is performed on the fake information in a first dimension in the second image. Whether fake information in a first dimension exists in the first image and the second image is determined based on the fusion features obtained by performing fusion on the first convolution processing result and the second convolution processing result. Be means of mutual corroboration between the first feature data and the second feature data, the fake information in a first dimension in the first image and the second image can be recognized more accurately.

In the embodiments of this disclosure, fusion is performed on the first feature data and the second feature data to obtain fusion features. Whether fake information exists in the first image and/or the second image can be determined more comprehensively and accurately according to the fusion features.

In some embodiments, the method for detecting a living body further includes: determining whether the first image and the second image satisfy a frame selection condition. The obtaining key point depth information of the target object according to the first target region and the second target region includes: obtaining, if it is determined that the first image and the second image satisfy the frame selection condition, key point depth information of the target object according to the first target region and the second target region.

In some embodiments, the frame selection condition includes one or any combination of the following conditions:

the target object is detected in both the first image and the second image;

the target object detected in the first image is located in a set region of the first image and the target object detected in the second image is located in a set region of the second image;

completeness of the target object detected in the first image and completeness of the target object detected in the second image satisfy a preset condition;

a proportion, in the first image, of the target object detected in the first image is greater than a proportion threshold and a proportion, in the second image, of the target object detected in the second image is greater than the proportion threshold;

clarity of the first image and clarity of the second image both are greater than a clarity threshold; and exposure of the first image and exposure of the second image both are greater than an exposure threshold.

In some embodiments, if the target object is detected in only one of the first image and the second image, the first image and the second image do not satisfy the frame selection condition, and the operations of obtaining the first target region and the second target region are not performed.

In some embodiments, if the position of the target object detected in the first image or the second image is not within a set central region, or the completeness of the detected target object is less than a set completeness threshold, for example, the detected target object does not include edges, or the proportion of the target object in the image is less than one half, or the clarity of the first image or the second image is too low, or the exposure of the first image or the second image is too low, the first image and the second image do not satisfy the frame selection condition, and the operations of obtaining the first target region and the second target region are not performed In some embodiments, if the first image and the second image satisfy the frame selection condition, it is considered that the first image and the second image meet requirements, and the target object detected in the first image and the second image also meets requirements, so that key point depth information of the target object can be obtained. In the embodiments of this disclosure, based on the first image and the second image satisfying the frame selection condition, the obtained key point depth information of the target object is more accurate, and a more accurate living-body detection result is obtained.

In some embodiments, a near-infrared camera cannot obtain image information in a screen. Therefore, if an image in a screen is captured by using a binocular camera apparatus with a near-infrared camera and a visible light camera, the target object can be detected in the image captured by the visible light camera, but the target object cannot be detected in the image captured by the near-infrared camera. A dual-channel camera under a dark condition cannot obtain image information in the screen, either. If one camera in the binocular camera apparatus is a near-infrared camera or a dual-channel camera under a dark condition and the other one is a visible light camera or a dual-channel camera under a non-dark condition, the images captured by the binocular camera apparatus can be directly used for living-body detection.

In some embodiments, if the binocular camera apparatus is not a binocular camera apparatus of which one camera is a near-infrared camera or a dual-channel camera under a dark condition and the other one is a visible light camera or a dual-channel camera under a non-dark condition, a pair of image frames is selected from the video captured by the binocular camera apparatus, and if target object detection is performed on the pair of image frames, if no target object is detected in at least one of the image frames, the pair of image frames is excluded and the target object detection is performed on the next pair of image frames. If the number of pairs of image frames in which no target object is detected simultaneously reaches a set number, it is determined that the target object is a non-living body or the living-body detection is ended.

In some embodiments, the method for detecting a living body further includes: determining whether a next image pair in a video stream satisfies a frame selection condition if at least one of the first image and the second image does not satisfy the frame selection condition. The video stream is determined as a fake video stream in the case that no image pair satisfying the frame selection condition is found from the video stream within a preset time period or within a preset number of image pairs.

In some embodiments, if an image pair in a video stream does not satisfy the frame selection condition, the next image frame is selected from the video stream, and it is continued to determine whether the image pair satisfies the frame selection condition. In some embodiments, if no image pair satisfying the frame selection condition is found from the video stream within a preset time period, it is considered that the video stream is a fake video stream. For example, the preset time period is N seconds, and if no image pair satisfying the frame selection condition is found from the video steam within the time period from the start time to the Nth seconds, the video stream is determined as a fake video stream. Alternatively, if no image pair satisfying the frame selection condition is found from the video steam within preset M pairs of images, the video stream is determined as a fake video stream.

In the embodiments of this disclosure, if no image pair satisfying the frame selection condition is found from the video stream within a preset time period or within a preset number of image pairs, the video stream is determined as a fake video stream. The detection efficiency of a video stream is improved.

In some embodiments, the first image sensor or the second image sensor includes one of the following cameras: a visible light camera, a near-infrared camera, and a dual-channel camera. The visible light camera is a camera for forming a video image by irradiating an object by using visible light. The near-infrared camera is a camera for forming a video image by irradiating an object by using near-infrared light. The dual-channel camera is a camera for forming a video image by using a dual-channel (including an R channel) imaging principle. The two cameras in the binocular camera apparatus are the same type of cameras, or are different types of cameras. For example, the two cameras in a binocular camera apparatus A are both visible light cameras; the two cameras in a binocular camera apparatus B are a visible light camera and a near-infrared camera respectively; the two cameras in a binocular camera apparatus C are a visible light camera and a dual-channel camera respectively; the two cameras in a binocular camera apparatus D are both dual-channel cameras. A binocular camera apparatus equipped with different types of cameras can be selected according to the requirements for face anti-spoofing detection.

In the embodiments of this disclosure, the types of the two cameras in a binocular camera apparatus can be selected according to requirements, and the types of the two cameras are the same or different, which has a broader application range and is easier to be expanded.

In some embodiments, the method for detecting a living body further includes: pre-processing at least one of the first image and the second image, where the pre-processing includes one or any combination of the following: image type adjustment, size adjustment, z-score normalization processing, and brightness adjustment.

The performing the target object detection on the first image captured by the first image sensor to obtain the first target region, and performing the target object detection on the second image captured by the second image sensor to obtain the second target region includes: performing the target object detection on the first image pre-processed to obtain the first target region, and performing the target object detection on the second image pre-processed to obtain the second target region.

In some embodiments, the types of the two cameras in a binocular camera apparatus are different, and the first image and the second image are in different formats. For example, if the type of camera is a visible light camera, the type of captured image is a visible light image; if the type of camera is a near-infrared camera, the type of captured image is a near-infrared image; if the type of camera is a dual-channel camera, the type of captured image is a dual-channel image. According to different models of cameras, the visible light image, the near-infrared image, and the dual-channel image are in different formats. The first image and the second image are processed into the same format if the first image and the second image are in different formats. For example, the first image and the second image are processed into bmp format, jpg format, etc. The sizes of the first image and the second image are adjusted so that the first image and the second image have the same size. In the subsequent processing steps of the embodiments of this disclosure, face detection can be performed accurately according to the first image and the second image having the same size. Z-score normalization processing is performed on the first image and the second image, so that the data of the processed first image and second image conforms to a standard normal distribution, and a more accurate detection result is obtained in the subsequent processing steps. Brightness adjustment is performed on the first image and the second image. For example, brightness adjustment is performed if the type of first image and/or second image is a visible light image. darkness improvement processing based on histogram equalization is performed on the first image and the second image. In an application scenario of a binocular camera apparatus, the to-be-detected face of a photographed object may be under a dark condition, and the brightness of the first image and the second image obtained by photographing the to-be-detected face under the dark condition is relatively low, which is possible to affect the accuracy of the result of the face anti-spoofing detection. The brightness adjustment can re-adjust the brightness distribution of the image, so that the first image and the second image, which are originally captured under the dark condition, can satisfy the requirements for the quality of the images in the method for detecting a face anti-spoofing according to the embodiments of this disclosure, thereby obtaining a more accurate anti-spoofing detection result. The brightness adjustment is also performed on the first image and the second image captured under a condition with strong light.

It can be understood that, the embodiments of the method described in this disclosure can be combined with each other, without violating the logic of principles, to form combined embodiments, and details are not described repeatedly in the embodiments of this disclosure due to limited space.

The living-body detection described in the foregoing embodiment is described below by using a human-face anti-spoofing scenario. Human face anti-spoofing is an important issue in the technical field of information security and anti-spoofing. At present, a human face anti-spoofing technology is used for identity information verification and recognition, and generally, human face anti-spoofing and interactive living-body detection are combined, or independent anti-spoofing detection is performed directly by using a monocular camera. In the human face anti-spoofing algorithm based on binocular cameras provided by the embodiments of this disclosure, corresponding human face images captured by the binocular cameras are obtained, and whether the human face is a fake human face is determined based on parallax information in the two human face images, where the binocular cameras include, but are not limited to, the following cameras: a visible light camera and a visible light camera, a visible light camera and a near-infrared camera, a visible light camera and a dual-channel camera, a dual-channel camera and a dual-channel camera, etc. The technical solution has good expansibility and can be adapted to various different types of cameras.

The technical solution provided in the embodiments of this disclosure has at least one of the following beneficial effects: (1) human face anti-spoofing is determined based on parallax information of the two images captured by the binocular cameras, and human face anti-spoofing detection can be assisted effectively based on the human face depth information obtained by the binocular cameras, so that various difficult technical problems in practical application can be solved, for example, the problem of the inconsistency of the human faces detected in the left and right images captured by the binocular cameras, the problem of low accuracy of the monocular camera for 2D and 2.5D fake human faces, etc. (2) Compared with the anti-spoofing detection manners which need to make various complex actions according to system instructions, there is basically no interaction in the binocular-based human face anti-spoofing detection process, which greatly simplifies the living-body detection process. The object to be detected only needs to face the binocular cameras, as long as the light and positions have been adjusted. (3) Human face faking feature modeling is performed by using a deep learning framework, so that the fake information is distinguished more accurately, a real human face can be well differentiated from a fake human face, and the attack of various types of fake human faces can be resisted. The human face anti-spoofing problem is solved by using the deep learning framework, modeling can be performed by using the strong description capability of the deep neural network, and the difference between the real and fake human faces in multiple dimensions, that can be observed by the human eyes, is learned by means of large-scale data training. In addition, a general human face anti-spoofing solution is implemented by means of deep learning, iterative update can be performed in a timely manner, and anti-spoofing detection can be quickly suited to the emerging faking situations. (4) Compared with other solutions, the solution in the embodiments of this disclosure has good expansibility, the iteration manner is easy to operate, and the solution can effectively increase the accuracy of detecting the fake information of a human face. (5) In the embodiments of this disclosure, a multi-feature fusion manner is used for different faking clues, fake information in different dimensions that can be observed by the human eyes is detected, and the detected fake information (or referred to as fake features) of a human face includes: 1) fake information in a 2D dimension including: the edge of a paper human face, the light reflection of the paper surface, the material of the paper, etc.; 2) fake information in a 2.5D dimension including: the edge of the screen of a human face image or video re-capturing device, the light reflection of the screen, the Moire patterns of the screen, etc.; and 3) fake information in a 3D dimension including: information extracted from a mask, a model, a sculpture, and the joint between a mask faking a human face and the human face, or too smooth skin, etc., thereby resisting various spoofing attacks.

The method, apparatus, etc. provided according to the embodiments of this disclosure can be implemented by means of an application (App). In practical application, if performing identity authentication by means of face anti-spoofing detection, a user opens the App that can implement the method provided according to the embodiments of this disclosure, and faces the binocular cameras to ensure that the face is within the picture for a few seconds, thereby completing and passing the face anti-spoofing detection. If the user performs identity authentication by using a pre-prepared fake face video or photo, etc., the video or the picture is projected onto a display screen and faces the binocular cameras, and face anti-spoofing detection cannot be passed within a specified period, and the user fails to pass the anti-spoofing detection.

Figure 7B:
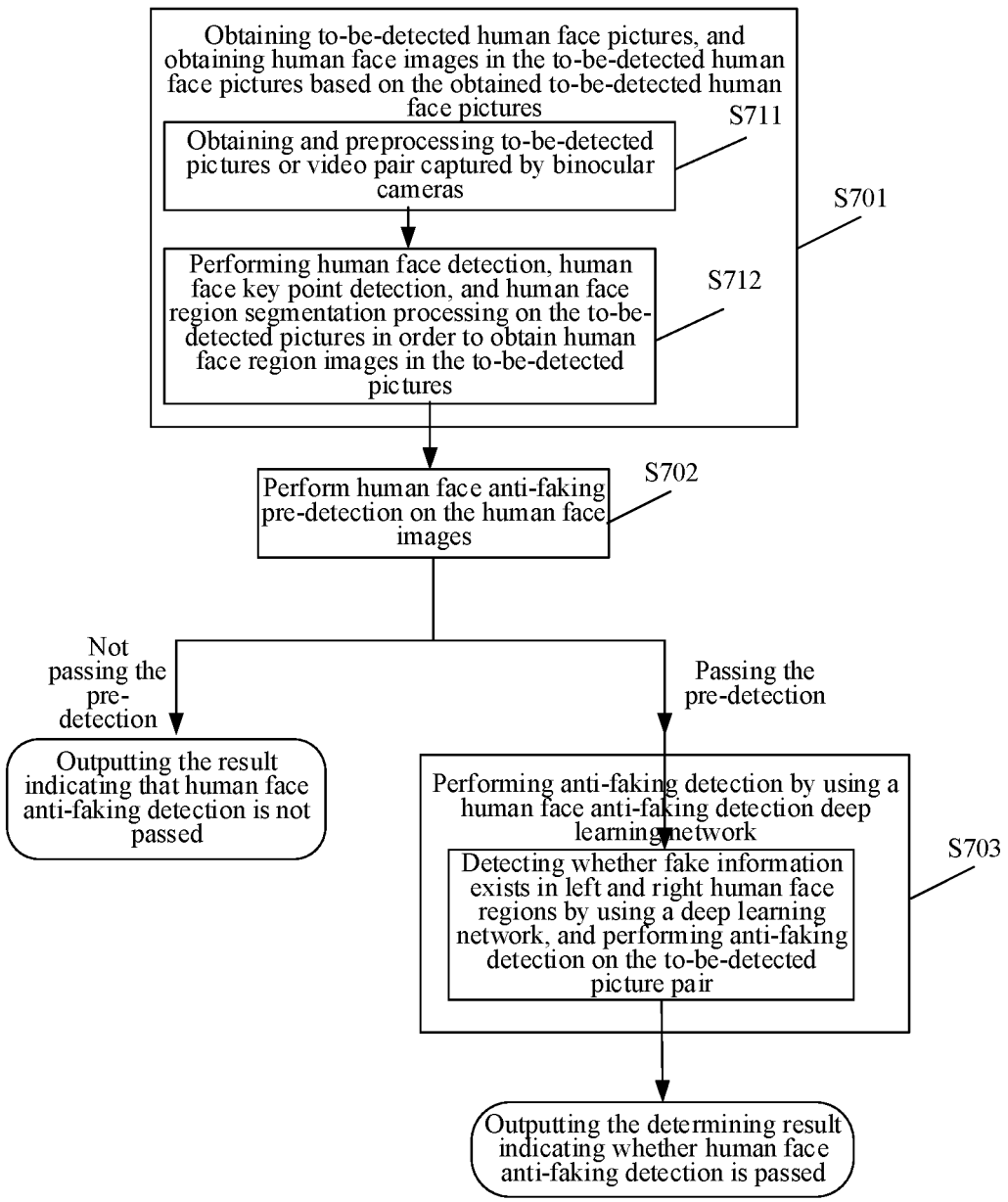
FIG. 7B is an exemplary flowchart of the human face living-body detection method according to embodiments of this disclosure.

FIG. 7B is an exemplary flowchart of the human face living-body detection method according to embodiments of this disclosure.

In step S701, to-be-detected human face pictures are obtained, and human face images in the to-be-detected human face pictures are obtained based on the obtained to-be-detected human face pictures.

The to-be-detected human face pictures are pictures containing only a human face or pictures in which a human face is contained and a document is held in hand. The embodiments of this disclosure does not limit the specific implementation of the human face picture. In addition, the to-be-detected human face pictures are static pictures or video picture frames, where if the to-be-detected human face pictures are video picture frames, frame selection is performed on a video frame sequence to obtain the to-be-detected human face pictures, and no limitation is made thereto in the embodiments of this disclosure.

In some implementations, step S701 includes:
step S711, obtaining and pre-processing to-be-detected pictures or video pair captured by binocular cameras; and
Step S712, performing human face detection, human face key point detection, and human face region segmentation processing on the to-be-detected pictures in order to obtain human face region images in the to-be-detected pictures.

During implementation, a plurality of human face pictures captured by the binocular cameras on the scene are obtained. If the types of input files are different, it is required to unify the type of input interface files into picture files. Only necessary image pre-processing operation is performed on a picture file, and the picture file is input to a network subsequently; frame selection operation needs to be performed on a video file, image pre-processing operation is performed on the picture obtained after the frame selection, and the video file is to be input to the network subsequently. The frame selection operation is used for selecting at least one pair of images from a part of a video as to-be-detected images, it is required to select a pair of images captured simultaneously by the binocular cameras as the to-be-detected images, the selected images have high quality, and whether fake information exists in the at least one pair of to-be-detected images is finally detected. The quality of an image is evaluated according to any one or more of the following criteria: whether a target is located in the center of the image, the human face is completely included in the image, the proportion of the area of the surface of the human face in the image, the clarity of the image, the exposure, etc. In some implementations, a selected high-quality image satisfies the following conditions: the human face is located in the center of the image, the edge of the human face is completely included in the image, the proportion of the human face in the image is ½ to ¾, the clarity of the image is high, and the exposure is high. According to the selection above, the orientations, clarity, brightness of light of human face images may be automatically detected by means of a set algorithm, and according to preset criteria, a pair or pairs of images with the best indexes is selected from the whole to-be-detected video, or a pair or pairs of images is separately selected from different interaction modules. The image pre-processing operation includes one or more of size adjustment, z-score normalization, and darkness improvement based on histogram equalization. The pre-processing operation mainly has the functions of unifying the sizes of the pictures input to the network, and causing processed data to conform to a standard normal distribution. In addition, the darkness improvement pre-processing operation based on histogram equalization is mainly performed in an actual human face anti-spoofing detection scenario, the human face may be under a dark condition, it is easy to affect the accuracy of human face anti-spoofing detection, the image brightness distribution can be readjusted for the images on which darkness improvement is performed, so that the images captured originally under the dark condition can satisfy the requirements for the quality of the images during anti-spoofing detection, so as to obtain a more accurate anti-spoofing detection result, and the darkness improvement operation is generally performed for the images captured by visible light cameras.

In some embodiments, for the images obtained after the image pre-processing and frame selection operations are performed, it is required to perform the following operations: 1) human face detection: detecting human face region positions from the left and right images obtained from binocular cameras, and returning the coordinates of the rectangular boxes of the human face regions, where the human face detection is rough, and the detected human face regions need to be further adjusted and fined; 2) human face key point detection: extracting the coordinates of a preset number of key points of the human face from the human face images obtained during the human face detection, for example, the coordinates of 106 or 240 key points; and 3) human face region segmentation: detecting the specific human face position regions based on the coordinates of the key points of the human face, for example, determining the smallest rectangles according to the key points, and amplifying the smallest rectangles by specific multiple times, for example ⅕ to ⅔ times, and using the amplified rectangular boxes as the final human face regions.

The subsequent human face anti-spoofing detection is performed after the human face regions in the two images are obtained.

In step S702, human face anti-spoofing pre-detection is performed on the human face images.

Before the two processed human face images above are input to a deep neural network for human face anti-spoofing detection, it is required to perform human face anti-spoofing pre-detection. In some possible implementations, the pre-detection is performed for at least one of the following contents: 1) pre-detection is performed according to the characteristics of different types of cameras; 2) the consistency of human faces is determined according to the human face images detected simultaneously by using binocular cameras; and 3) human face depth information is extracted based on the human face images obtained simultaneously by using the binocular cameras, and anti-spoofing pre-detection is performed based on the depth information.

The cameras applicable to this solution include, but are not limited to, the following several types: a visible light camera, a near-infrared camera, a dual-channel camera, etc. Different types of cameras have different characteristics. For example, the visible light camera can correspondingly perform photographing to obtain different types of faking clue information that can be observed by the human eyes, for example, faking clues in a 2D dimension including: the edge of a paper human face, the light reflection of the paper surface, the material of the paper, etc.; faking clues in a 2.5D dimension including: the edge of the screen of a human face image or video re-capturing device, the light reflection of the screen, the Moire patterns of the screen, etc.; fake information in a 3D dimension including: information extracted from a mask, a model, a sculpture, and the joint between a mask faking a human face and the human face, or too smooth skin, etc. The near-infrared camera can correspondingly perform photographing to obtain the human face image information that cannot be accurately obtained by the visible light camera under a dark condition, and the near-infrared camera cannot obtain the information of the human face image re-captured from the screen, and can directly prevent 2.5D faking clue interference during the subsequent detection process, so as to perform human face anti-spoofing detection. The dual-channel camera has both the characteristics of the visible light camera under a bright condition and the characteristics of the near-infrared camera under the dark condition, cannot obtain the information of the human face image re-captured from the screen under the dark condition, either, and can directly prevent 2.5D faking clue interference during the subsequent detection process, so as to perform human face anti-spoofing detection.

Figure 7C:
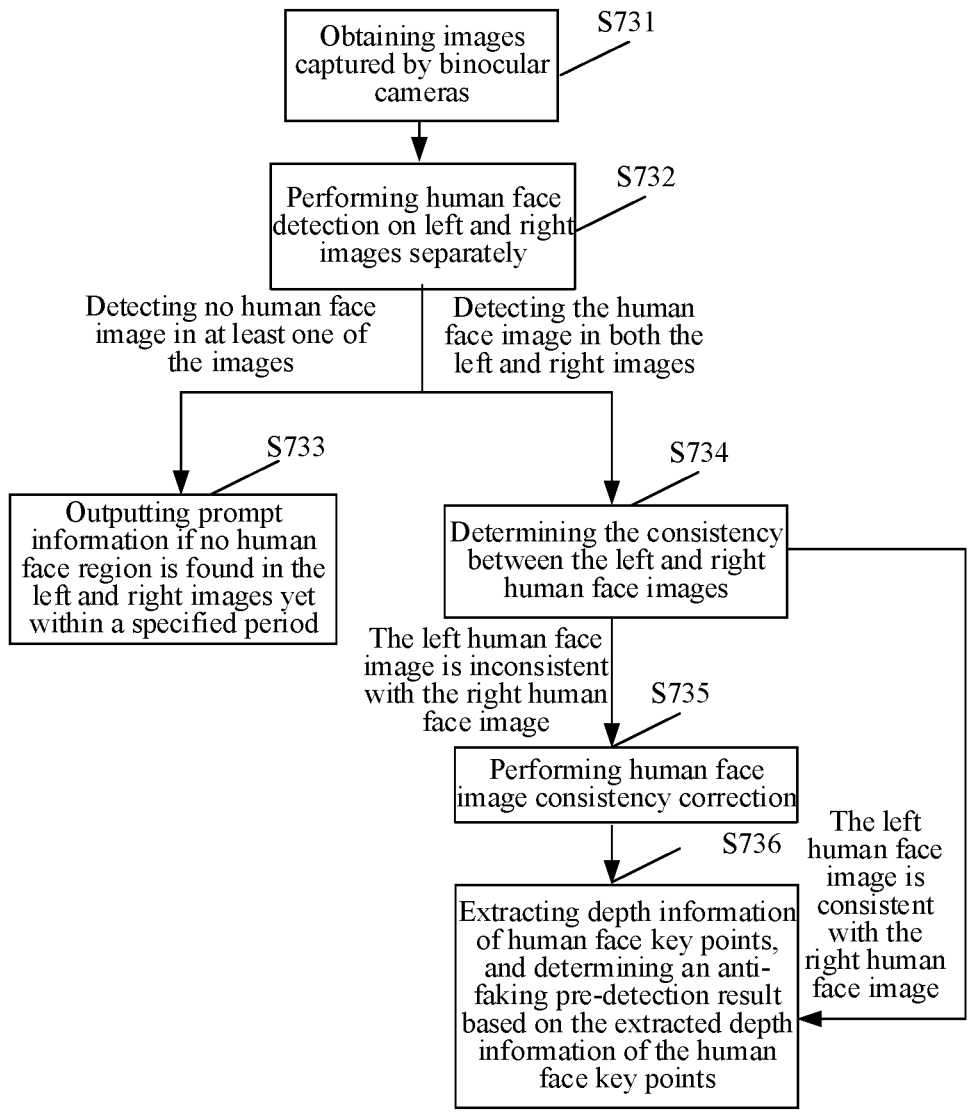
FIG. 7C is an exemplary flowchart for performing human face anti-spoofing pre-detection on a human face image according to FIG. 7B of embodiments of this disclosure.

In some embodiments, the process of performing human face anti-spoofing pre-detection on human face images based on the characteristics of the various cameras is as shown in FIG. 7C, including the following steps.

Step S731, images captured by binocular cameras.

Step S732, human face detection is performed on the left and right images separately. If no human face is detected in at least one of the images, step S733 is executed; while if a human face is detected in both the left and right images, step S734 is executed.

Step S733, if no human face region is found in the left and right images yet within a specified period, prompt information is output, for example, "the human face anti-spoofing pre-detection is not passed" or "the detection times out".

After the sequence of images of the sequence of videos captured by the binocular cameras, human face detection is separately performed on the simultaneously captured left and right images included in the sequence of images of the sequence of videos; if no human face is detected in one of the images or the two images, frame selection is continued for human face detection; if no human face is found in the left and right images yet within a specified period, it is directly determined that the human face is a fake human face or prompt information is output, for example, words such as "the detection times out".

Step S734, the consistency between the left and right human face images is determined. If the left human face image is inconsistent with the right human face image, step S735 is executed; if the left human face image is consistent with the right human face image, step S736 is executed. Optionally, the determination result indicating whether the human face anti-spoofing pre-detection is passed is further output.

In an actual application scenario, a plurality of real human faces may appear in the same picture or a real human face and a fake human face may appear simultaneously in the same picture. In this case, before human face anti-spoofing detection, it is required to perform consistency checking on the human face regions detected in the left and right images, where whether the human face regions are fake human face regions is determined, so as to ensure that the human face regions detected in the left and right images correspond to the same human face. In some embodiments, after the human face regions detected in the left and right images are obtained, human face similarity determination is performed on the two human face regions, so as to determine whether the two human face regions correspond to the same person by means of comparison. In other possible implementations, human face recognition is separately performed on the human face regions detected in the left and right images. Specifically, the two human face regions are separately compared with the human face template saved in a database, so as to determine whether the human face regions detected in the two images correspond to the same target human face. In some possible implementations, human face consistency checking is performed in other ways, and no limitation is made thereto in the embodiments of this disclosure.

Step S735, human face image consistency correction is performed.

In some embodiments, consistency correction is performed by means of human face region mapping. Specifically, after the left and right images are obtained, human face detection and human face key point detection are performed on the left image (or the right image) is performed first to obtain position information of the human face key points, and the human face position region in the left image is determined based on the position information of the human face key points. In an example, the smallest rectangle is determined according to the position information of the key points, and the smallest rectangle is amplified by specific multiple times, for example, ⅖ to ⅔ times to obtain an expanded region, and the expanded region is mapped to the region range in the right image as the target region for the human face detection; finally, the human face image in the right image corresponding to the human face region detected in the left image is detected in the mapped region.

In other embodiments, consistency correction is performed by means of key point mapping. Specifically, binocular cameras are calibrated, the intrinsic parameters and extrinsic parameters of specific cameras or a specific batch of cameras are obtained, and the positions of the human face key points extracted from the left image (or the right image) are mapped to the right image (or the left image) by using a specific algorithm, so that the positions of the human face key points mapped to the right image (or the left image) correspond to the positions in the human face in the right image (or the left image), so as to obtain consistent left and right human face regions. In an example, refer to the descriptions of formulas (2-1) to (2-9) for the specific algorithm.

Step S736, depth information of the human face key points is extracted, and an anti-spoofing pre-detection result is determined based on the extracted depth information of the human face key points. In this step, reference may be made to formulas (1-1) to (1-7) in step S22 for the extraction algorithm for the depth information of the human face key points.

By means of the anti-spoofing pre-detection, faking clues in a 2D dimension, such as a paper human face, and faking clues in a 2.5D dimension, such as fake information re-captured from a mobile phone or a screen is detected directly based on the depth information, so that human face anti-spoofing is effectively performed in this aspect. Reference may be made to formulas (1-1) to (1-7) in step S22 for the extraction algorithm for the depth information of the human face key points.

The pre-detection mainly has the following improved effects in anti-spoofing detection: a near-infrared camera or a dual-channel camera under a dark condition is used as at least one of the binocular cameras, and can perform effective human face anti-spoofing detection on the fake clues in a 2.5D dimension, i.e., the fake human face re-captured from the mobile phone or the screen of a computer.

Step S703, anti-spoofing detection is performed by using a human face anti-spoofing detection deep learning network.

Specifically, whether fake information exists in the left and right human face regions is detected by using a deep learning network, and anti-spoofing detection is performed on the to-be-detected picture pair. During the implementation of human face anti-spoofing detection, fake information feature modeling and fake information feature determination are performed by using the deep learning network. During the determination, first, human face anti-spoofing pre-detection is performed on the obtained to-be-detected images according to the contents above; if the human face anti-spoofing pre-detection is not passed, prompt information is output, for example, words such as "the human face anti-spoofing detection is not passed" or "the detection times out"; if the human face anti-spoofing pre-detection is passed, after the pictures of the segmented regions of the left and right human faces are obtained, whether fake information exists in the human face region pictures above is detected by using the deep learning network, so as to perform anti-spoofing detection on the to-be-detected pictures. If fake clues are detected in any one of three (2D, 2.5D, and 3D) detections, it is determined that fake clues are included in the to-be-detected pictures, and the result indicating that the human face anti-spoofing detection is not passed is output. Otherwise, prompt information indicating that the human face anti-spoofing detection is passed is output or a user request operation is performed.

In some implementations, feature extraction is performed on the to-be-detected images by using a deep network, and whether fake information is included in the extracted information is determined. The extracted features include, but are not limited to, any several of the following: local binary pattern (LBP) features, histogram-of-sparse-code (HSC) features, color (RGB) features, global (LARGE) features, region (SMALL) features, and detail (TINY) features. In an application, whether fake information features are included in the extracted features is further learned and determined by training a deep neural network model in advance, and then all the images including the fake information features can be detected after being input to a deep neural network. If the extracted features include one or more of the fake information features above, the to-be-detected images are determined as fake human face images, or else, the to-be-detected images are real human face images. The feature extraction and determining operations are both implemented by the trained deep neural network above. By means of the trained deep neural network for recognizing fake features, comprehensive feature extraction and feature fusion are separately performed on the human face region images segmented from the at least one pair of to-be-detected images. The deep neural network is different from a general network structure individually used for human face detection, a more complex model is used, the deep neural network includes two branches for separately performing feature modeling on the left and right human face region information, after the features of the parts are extracted, two feature vectors are connected to establish a unified anti-spoofing detection determining device, and the connected feature vectors are input to the determining device, so as to simultaneously obtain the results indicating whether fake information is included in the features extracted from the two images. If fake information is detected in either of the two images, it is determined that fake information is included in the to-be-detected pictures, and the result indicating that the human face anti-spoofing detection is not passed is output. Otherwise, the result indicating that human face anti-spoofing detection is passed is output. Based on whether any one kind of a plurality of classes of fake information is included in the extracted comprehensive features, whether fake clues are included in the to-be-detected images is detected by the deep neural network to obtain an anti-spoofing detection result indicating whether the to-be-detected images are fake images in which a human face is contained and a document is held in hand. For example, if the input fake human face images are human face images captured by a video re-capturing device, the features extracted based on the deep neural network should include SMALL features, which include fake clues in a 2.5D dimension, i.e., the edge of the screen of a human face image or video re-capturing device, the light reflection of the screen, the Moire patterns of the screen, etc.; if it is determined by a classifier that the features extracted based on the deep neural network do not include any one of the fake features above, it is determined that the comprehensive features extracted in this case do not include fake information. If no fake information exists in the to-be-detected images, to-be-detected videos or images pass the human face anti-spoofing detection. Otherwise, if any one or more kinds of the plurality of classes of fake information exist in any one of the to-be-detected images, the to-be-detected videos or images do not pass the human face anti-spoofing detection.

In one technical solution provided in the embodiments of this disclosure, human face anti-spoofing is determined based on parallax information of the two images captured by the binocular cameras, so that various technical difficult problems in practical application can be solved, for example, the problem of the inconsistency of the human faces detected in the left and right images captured by the binocular cameras, the problem of low accuracy of the monocular camera for 2D and 2.5D fake human faces, etc. In addition, the human face anti-spoofing problem is solved by using the deep learning framework, modeling can be performed by using the strong description capability of the deep neural network, and the difference between the real and fake human faces in multiple dimensions that can be observed by the human eyes is learned by means of large-scale data training so as to resist the attacks of various fake human faces. The technical solution is a low-interaction fake human face detection solution.

In addition, the embodiments of this disclosure further provides an image processing apparatus, an electronic device, a computer-readable storage medium, and a program, which can all be configured to implement any image processing method provided according to the embodiments of this disclosure. Refer to the corresponding contents in the method for corresponding technical solutions and descriptions, and details are not described repeatedly.

Figure 8:
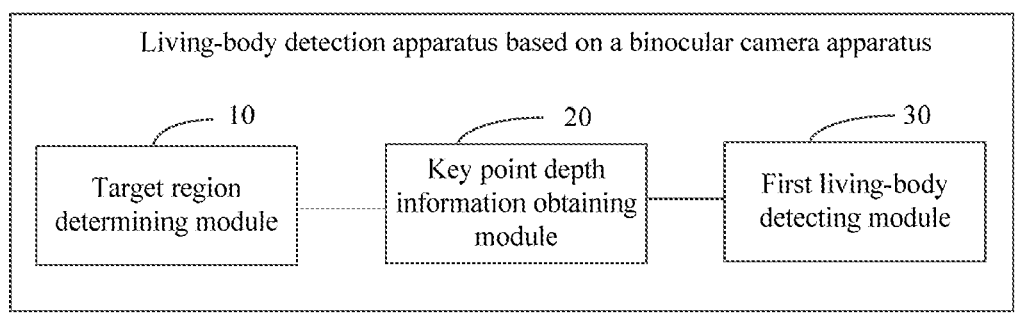
FIG. 8 is an exemplary block diagram of an apparatus for detecting a living body according to embodiments of this disclosure.

FIG. 8 is an exemplary block diagram of an apparatus for detecting a living body according to embodiments of this disclosure.

A target region determining module 10 is configured to perform target object detection on a first image captured by a first image sensor in a binocular camera apparatus to obtain a first target region, and to perform the target object detection on a second image captured by a second image sensor in the binocular camera apparatus to obtain a second target region; a key point depth information obtaining module 20 is configured to obtain key point depth information of a target object according to the first target region and the second target region; and a first living-body detecting module 30 is configured to determine, based on the key point depth information of the target object, whether the target object is a living body.

Figure 9:
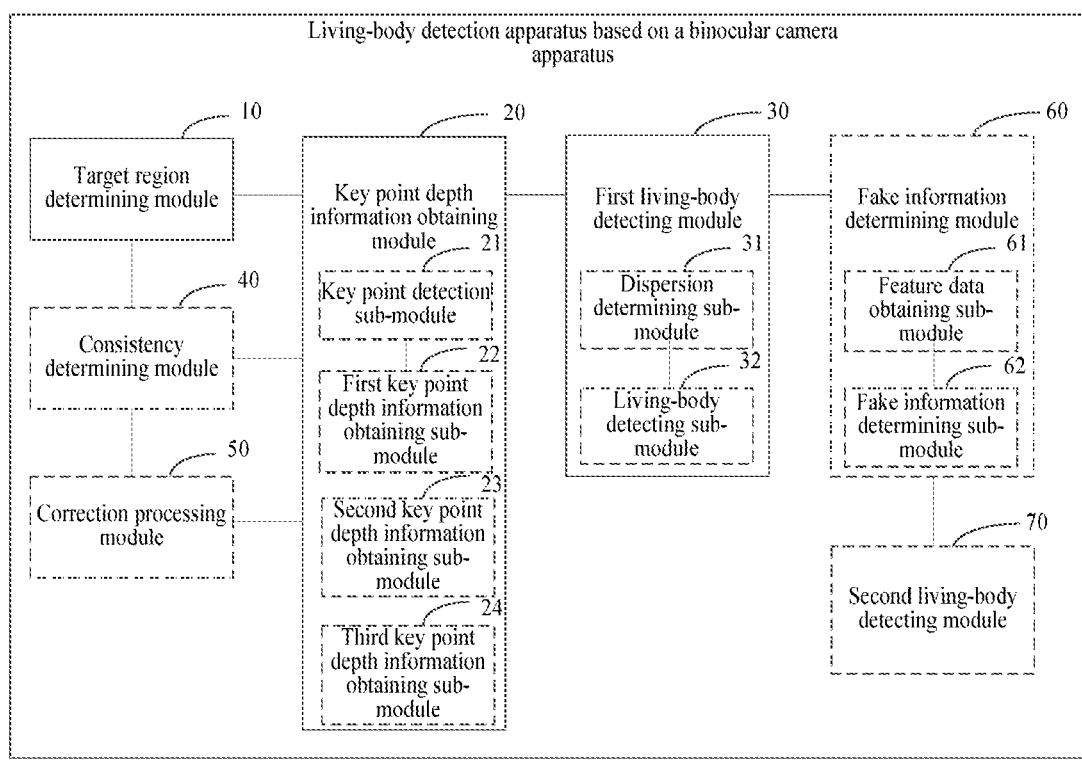
FIG. 9 is an exemplary block diagram of the apparatus for detecting a living body according to embodiments of this disclosure.

FIG. 9 is an exemplary block diagram of the apparatus for detecting a living body according to embodiments of this disclosure.

The key point depth information obtaining module 20 includes: a key point detection sub-module 21, configured to perform key point detection on the first target region to obtain key point information of the first target region, and to perform the key point detection on the second target region to obtain key point information of the second target region; and a first key point depth information obtaining sub-module 22, configured to determine key point depth information of the target object according to the key point information of the first target region and the key point information of the second target region.

In some embodiments, the living-body detecting module 30 includes: a dispersion determining sub-module 31, configured to determine depth dispersion based on the key point depth information of the target object; and a living-body detecting sub-module 32, configured to determine, according to the depth dispersion, whether the target object is a living body. In some embodiments, the apparatus further includes: a consistency determining module 40, configured to determine whether the first target region is consistent with the second target region; the key point depth information obtaining module 20 further includes: a second key point depth information obtaining sub-module 23, configured to obtain, if it is determined that the first target region is consistent with the second target region, key point depth information of the target object according to the first target region and the second target region.

In some embodiments, the consistency determining module 40 includes: a search result determining sub-module, configured to search a database for a first search result corresponding to the first target region, and to search the database for a second search result corresponding to the second target region; and a first consistency determining sub-module, configured to determine, based on the first search result and the second search result, whether the first target region is consistent with the second target region.

In some embodiments, the consistency determining module 40 includes: a similarity determining sub-module, configured to determine the similarity between the first target region and the second target region; and a second consistency determining sub-module, configure to determine, based on the similarity, whether the first target region is consistent with the second target region.

In some embodiments, the apparatus further includes: a correction processing module 50, configured to obtain a corrected second target region based on the first target region if it is determined that the first target region is inconsistent with the second target region; the key point depth information obtaining module 20 includes: a third key point depth information obtaining sub-module 24, configured to obtain key point depth information of the target object according to the first target region and the corrected second target region.

In some embodiments, the correction processing module 50 includes: a corresponding region determining sub-module, configured to determine a corresponding region of the first target region in the second image; and a first correction processing sub-module, configured to determine the corresponding region as the corrected second target region.

In some embodiments, the corresponding region determining sub-module includes: a key region determining sub-module, configured to determine a key region in the first target region according to the key point information of the first target region; and a first corresponding region determining sub-module, configured to determine the corresponding region of the first target region in the second image based on the key region.

In some embodiments, the key region determining sub-module includes: a smallest region determining sub-module, configured to determine, based on the key point information of the first target region, a smallest region enclosed by at least one key point in the first target region; and a first key region determining sub-module, configured to amplify the smallest region by multiple times set in advance to obtain the key region.

In some embodiments, the corresponding region determining sub-module includes: a mapping position information determining sub-module, configured to map the at least one key point in the first target region to the second image to obtain mapping position information of the at least one key point in the second image; and a second corresponding region determining sub-module, configured to determine the corresponding region of the first target region in the second image according to the mapping position information of the at least one key point in the second image.

In some embodiments, the apparatus further includes: a fake information determining module 60, configured to determine whether fake information exists in the first image and the second image if it is determined, based on the key point depth information of the target object, that the target object is a living body; and a second living-body detecting module 70, configured to determine, based on whether fake information exists in the first image and the second image, the target object is a living body.

In some embodiments, the fake information includes one or any combination of the following information: edge information, light reflection information, and material information of an imaging medium; edge information, light reflection information, and Moire pattern information of a display screen; and mask information, sculpture information, and model information.

In some embodiments, the fake information determining module 60 includes: a feature data obtaining sub-module 61, configured to perform feature extraction processing on the first image and the second image separately to obtain first feature data and second feature data; and a fake information determining sub-module 62, configured to determine, based on the first feature data and the second feature data, whether fake information exists in the first image and the second image.

In some embodiments, the fake information determining sub-module 62 includes: a fusion feature obtaining sub-module, configured to perform fusion processing on the first feature data and the second feature data to obtain fusion features; and a first fake information determining sub-module, configured to determine, based on the fusion features, whether fake information exists in the first image and the second image. In some embodiments, the first feature data or the second feature data includes one or any combination of the following: local binary pattern features, histogram-of-sparse-code features, color features, global features, regional features, and detail features. In some embodiments, the apparatus further includes: a frame selecting module, configured to determine whether the first image and the second image satisfy a frame selection condition; the key point depth information obtaining module includes: a fourth key point depth information obtaining sub-module, configured to obtain, if it is determined that the first image and the second image satisfy the frame selection condition, key point depth information of the target object according to the first target region and the second target region.

In some embodiments, the frame selection condition includes one or any combination of the following conditions: the target object is detected in both the first image and the second image; the target object detected in the first image is located in a set region of the first image and the target object detected in the second image is located in a set region of the second image; completeness of the target object detected in the first image and completeness of the target object detected in the second image satisfy a preset condition; a proportion, in the first image, of the target object detected in the first image is greater than a proportion threshold and a proportion, in the second image, of the target object detected in the second image is greater than the proportion threshold; the clarity of first image and the second image is greater than a clarity threshold; and exposure of the first image and exposure of the second image both are greater than an exposure threshold.

In some embodiments, the apparatus further includes: an image pair determining module, configured to determine whether a next image pair in a video stream satisfies a frame selection condition if at least one of the first image and the second image does not satisfy the frame selection condition; and a fake video stream determining module, configured to determine the video stream as a fake video stream in the case that no image pair satisfying the frame selection condition is found from the video stream within a preset time period or within a preset number of image pairs. In some embodiments, the first image sensor or the second image sensor includes one of the following cameras: a visible light camera, a near-infrared camera, and a dual-channel camera.

In some embodiments, the apparatus further includes: a pre-processing module, configured to pre-process at least one of the first image and the second image, where the pre-processing includes one or any combination of the following: image type adjustment, size adjustment, z-score normalization processing, and brightness adjustment; the target region determining module includes: a target region determining sub-module, configured to perform target object detection on the first image pre-processed to obtain the first target region, and to perform the target object detection on the second image pre-processed to obtain the second target region.

In some embodiments, the target object is a human face.

Figure 10:
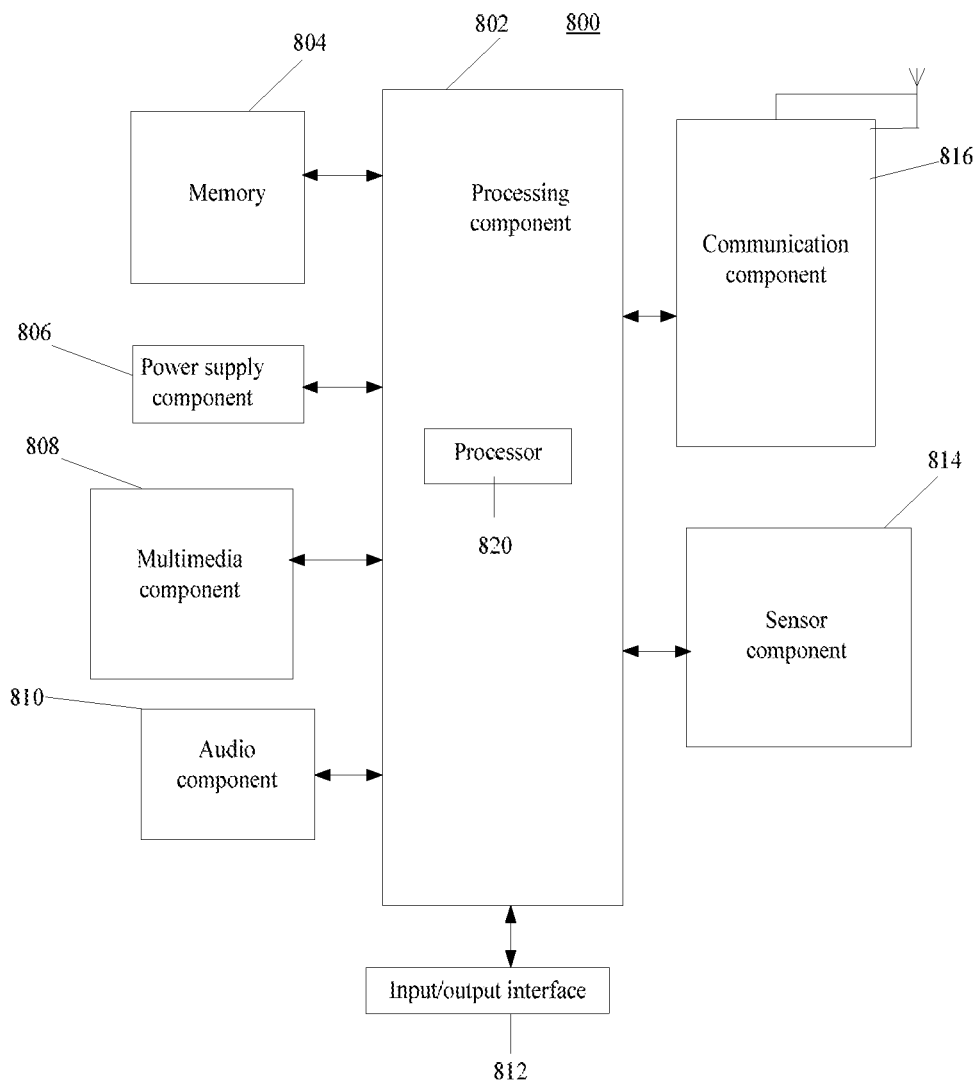
FIG. 10 is a block diagram of an electronic device illustrated according to exemplary embodiments.

FIG. 10 is a block diagram of an electronic device illustrated according to exemplary embodiments. The electronic device may be provided as a terminal, a server, or a device in other form. For example, the electronic device may be an apparatus 800 for detecting a living body. For example, the apparatus 800 may be a mobile phone, a computer, a digital broadcast terminal, a message transceiving device, a game console, a tablet device, a medical device, exercise equipment, a personal digital assistant, etc.

With reference to FIG. 10, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the apparatus 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations on the apparatus 800. Examples of the data include instructions for any App or method operated on the apparatus 800, contact data, contact list data, messages, pictures, videos, and etc. The memory 804 may be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk. The power supply component 806 provides power for various components of the apparatus 800. The power supply component 806 may include a power management system, one or more power supplies, and other components associated with power generation, management, and distribution for the apparatus 800.

The multimedia component 808 includes a screen between the apparatus 800 and a user that provides an output interface. In some embodiments, the screen may include a liquid crystal display (LCD) and a touch panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the apparatus 800 is in an operation mode, for example, a photography manner or a video mode, the front-facing camera and/or the rear-facing camera may receive external multimedia data. Each of the front-facing camera and the rear-facing camera may be a fixed optical lens system, or have focal length and optical zoom capabilities. The audio component 810 is configured to output and/or input an audio signal. For example, the audio component 810 includes a microphone (MIC), and the microphone is configured to receive an external audio signal when the apparatus 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal. The I/O interface 812 provides an interface between the processing component 802 and a peripheral interface module, which may be a keyboard, a click wheel, a button, etc. The button may include, but is not limited to, a home button, a volume button, a start button, and a lock button. The sensor assembly 814 includes one or more sensors for providing state assessment in various aspects for the apparatus 800. For example, the sensor component 814 may detect an on/off state of the apparatus 800, and relative positioning of components, which are the display and keypad of the apparatus 800, for example, and the sensor assembly 814 may further detect a position change of the apparatus 800 or a component of the apparatus 800, the presence or absence of contact of the user with the apparatus 800, the orientation or acceleration/deceleration of the apparatus 800, and a temperature change of the apparatus 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the apparatus 800 and other devices. The apparatus 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the apparatus 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, to execute the method above. In an exemplary embodiment, a non-volatile computer-readable storage medium is further provided, for example, a memory 804 including computer program instructions, which can be executed by the processor 820 of the apparatus 800 to implement the method above.

Figure 11:
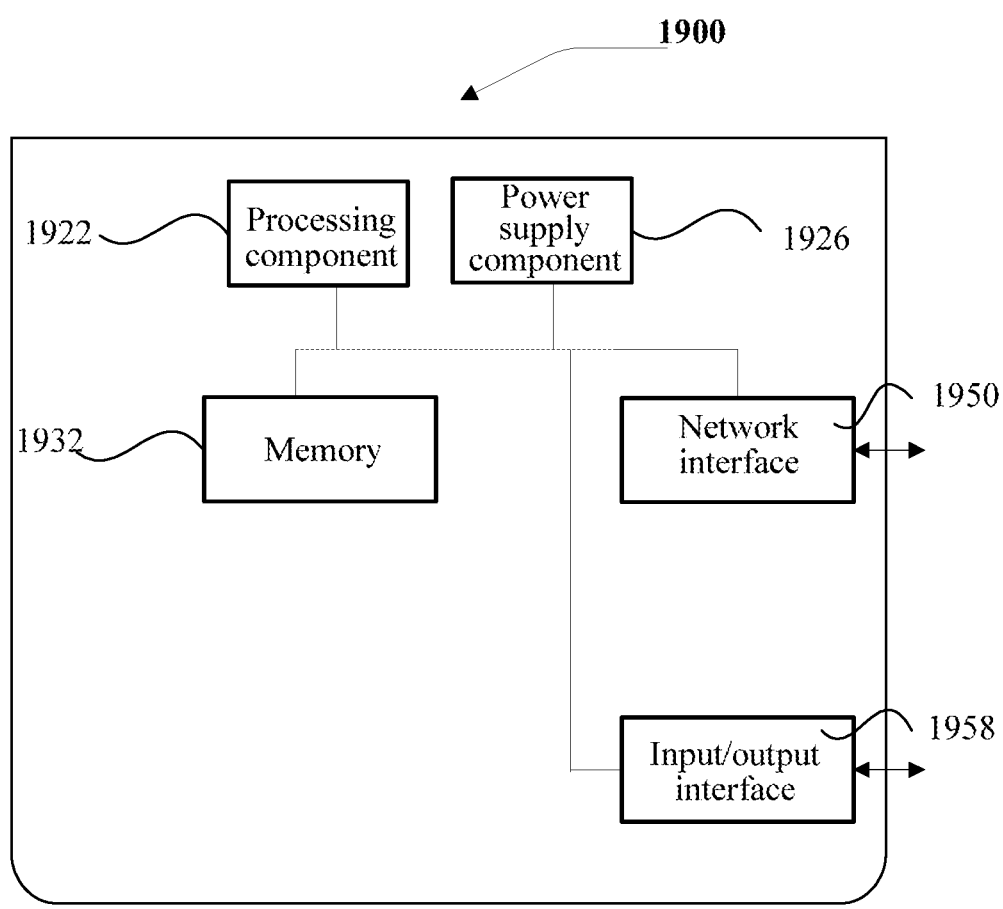
FIG. 11 is a block diagram of the apparatus for detecting a living body illustrated according to exemplary embodiments.

FIG. 11 is a block diagram of the apparatus for detecting a living body according to exemplary embodiments. For example, the apparatus 1900 may be provided as a server. With reference to FIG. 11, the apparatus 1900 includes a processing component 1922, which further includes one or more processors, and a memory resource represented by a memory 1932, configured to store instructions that can be executed by the processing component 1922, for example, an App. The App stored in the memory 1932 may include one or more modules each of which corresponds to a set of instructions. In addition, the processing component 1922 is configured to execute the instructions, to execute the method above. The apparatus 1900 may further include a power supply component 1926 configured to execute the power management of the apparatus 1900, a wired or wireless network interface 1950 configured to connect the apparatus 1900 to a network, and an I/O interface 1958. The apparatus 1900 can operate an operating system stored in the memory 1932, for example, Windows Server™, Mac OS X™, Unix™, Linux™, FreeBSD™, or similar. In an exemplary embodiment, a non-volatile computer-readable storage medium is further provided, for example, a memory 1932 including computer program instructions, which can be executed by the processor 1922 of the apparatus 1900 to implement the method above.

The embodiments of this disclosure may be a system, a method, and/or a computer program product. The computer program product may include a computer-readable storage medium having computer-readable program instructions thereon for causing a processor to implement the aspects of the embodiments of this disclosure. The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. + of the computer-readable storage medium include: a portable computer disk, a hard disk, a random access memory (RAM), an ROM, an EPROM or flash memory, an SRAM, a portable compact disk read-only memory (CD-ROM), a digital versatile disc (DVD), a memory stick, a floppy disk, a mechanically encoded device such as a punch-card or raised structure in a groove having instructions stored thereon, and any suitable combination of the foregoing. The computer-readable storage medium used herein is not to be construed as transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable program instructions described herein can be downloaded to respective computing/processing devices from the computer-readable storage medium or to an external computer or external storage device via a network, for example, the Internet, a local area network (LAN), a wide area network (WAN) and/or a wireless network. The network may copper transmission cables, fiber-optic transmission, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

The computer program instructions for performing the operations of the embodiments of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a WAN, or the connection may be made to an external computer (for example, through the Internet using an Internet service provider). In some embodiments, electronic circuitry including, for example, programmable logic circuitry, field-programmable gate arrays (FGPAs), or programmable logic arrays (PLAs) may execute the computer-readable program instructions by utilizing state information of the computer-readable program instructions to personalize the electronic circuitry, in order to implement the aspects of the embodiments of this disclosure.

The aspects of this disclosure are described herein with reference to flowcharts and/or block diagrams of methods, apparatuses (systems), and computer program products according to the embodiments of this disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in one or more blocks of the flowcharts and/or block diagrams. These computer-readable program instructions may also be stored in a computer-readable storage medium that can cause a computer, a programmable data processing apparatus, and/or other devices to function in a particular manner, such that the computer-readable medium having instructions stored therein includes an article of manufacture instructing instructions which implement the aspects of the functions/acts specified in one or more blocks of the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of this disclosure. In this regard, each block in the flowcharts or block diagrams may represent a module, program segment, or portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts can be implemented by special-purpose hardware-based systems that perform the specified functions or acts or carried out by combinations of special-purpose hardware and computer instructions.

The descriptions of the embodiments of this disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A method for detecting a living body, comprising:
performing target object detection on a first image captured by a first image sensor in a binocular camera apparatus to obtain a first target region, and performing the target object detection on a second image captured by a second image sensor in the binocular camera apparatus to obtain a second target region;
determining whether the first target region as a whole is consistent with the second target region;
determining, in response to the first target region as a whole being inconsistent with the second target region, a key region in the first target region based on key point information of the first target region, wherein the key point information comprises position information of key points in the first target region;
determining a corresponding region of the first target region in the second image based on position information of the key region;
obtaining key point depth information of a target object according to the first target region and the corresponding region; and determining, based on the key point depth information of the target object, whether the target object is a living body.

2. The method according to claim 1, wherein the obtaining key point depth information of the target object according to the first target region and the corresponding region comprises:
performing key point detection on the first target region to obtain key point information of the first target region, and performing the key point detection on the corresponding region to obtain key point information of the corresponding region; and
determining key point depth information of the target object according to the key point information of the first target region and the key point information of the corresponding region.

3. The method according to claim 1, wherein the determining, based on the key point depth information of the target object, whether the target object is the living body comprises:
determining depth dispersion based on the key point depth information of the target object; and
determining, according to the depth dispersion, whether the target object is the living body.

4. The method according to claim 1, wherein the determining whether the first target region as a whole is consistent with the second target region comprises:
searching a database for a first search result corresponding to the first target region;
searching the database for a second search result corresponding to the second target region; and
determining, based on the first search result and the second search result, whether the first target region as a whole is consistent with the second target region.

5. The method according to claim 1, wherein the determining whether the first target region as a whole is consistent with the second target region comprises:
determining a similarity between the first target region and the second target region; and
determining, based on the similarity, whether the first target region as a whole is consistent with the second target region.

6. The method according to claim 1, wherein obtaining the key point depth information of the target object according to the first target region and the corresponding region comprises:
determining the corresponding region as a corrected second target region;
obtaining the key point depth information of the target object according to the first target region and the corrected second target region.

7. The method according to claim 1, wherein the determining the key region in the first target region according to the key point information of the first target region comprises:
determining, based on the key point information of the first target region, a smallest region enclosed by at least one key point in the first target region; and
amplifying the smallest region by a preset number of times to obtain the key region.

8. The method according to claim 1, wherein the determining the corresponding region of the first target region in the second image comprises:
mapping at least one key point in the first target region to the second image to obtain mapping position information of the at least one key point in the second image; and
determining the corresponding region of the first target region in the second image according to the mapping position information of the at least one key point in the second image.

9. The method according to claim 1, further comprising:
determining whether fake information exists in the first image and the second image in response to determining, based on the key point depth information of the target object, that the target object is the living body; and
determining, based on whether the fake information exists in the first image and the second image, whether the target object is the living body.

10. The method according to claim 9, wherein the determining whether the fake information exists in the first image and the second image comprises:
performing feature extraction processing on the first image and the second image separately to obtain first feature data and second feature data; and
determining, based on the first feature data and the second feature data, whether the fake information exists in the first image and the second image.

11. The method according to claim 10, wherein the determining, based on the first feature data and the second feature data, whether the fake information exists in the first image and the second image comprises:
performing fusion processing on the first feature data and the second feature data to obtain fusion features; and
determining, based on the fusion features, whether the fake information exists in the first image and the second image.

12. The method according to claim 1, further comprising:
determining whether the first image and the second image satisfy a frame selection condition;
wherein the obtaining key point depth information of the target object according to the first target region and the second target region comprises:
obtaining, in response to determining that the first image and the second image satisfy the frame selection condition, key point depth information of the target object according to the first target region and the second target region.

13. The method according to claim 12, wherein the frame selection condition comprises one or any combination of the following conditions:
the target object is detected in both the first image and the second image;
the target object detected in the first image is located in a set region of the first image and the target object detected in the second image is located in a set region of the second image;
completeness of the target object detected in the first image and completeness of the target object detected in the second image satisfy a preset condition;
a proportion, in the first image, of the target object detected in the first image is greater than a proportion threshold and a proportion, in the second image, of the target object detected in the second image is greater than the proportion threshold;
clarity of the first image and clarity of the second image both are greater than a clarity threshold; and
exposure of the first image and exposure of the second image both are greater than an exposure threshold.

14. The method according to claim 12, further comprising:
determining, in response to determining that at least one of the first image or the second image does not satisfy the frame selection condition, whether a next image pair in a video stream satisfies the frame selection condition; and determining the video stream as a fake video stream in response to determining that no image pair satisfying the frame selection condition is found from the video stream within a preset time period or within a preset number of image pairs.

15. The method according to claim 1, wherein the target object is a human face.

16. An apparatus for detecting a living body, comprising:
a processor; and
memory for storing instructions executable by the processor;
wherein execution of the instructions by the processor causes the processor to perform operations, the operations comprising:
performing target object detection on a first image captured by a first image sensor in a binocular camera apparatus to obtain a first target region, and performing the target object detection on a second image captured by a second image sensor in the binocular camera apparatus to obtain a second target region;
determining whether the first target region as a whole is consistent with the second target region;
determining, in response to the first target region as a whole being inconsistent with the second target region, a key region in the first target region based on key point information of the first target region, wherein the key point information comprises position information of key points in the first target region;
determining a corresponding region of the first target region in the second image based on position information of the key region;
obtaining key point depth information of a target object according to the first target region and the corresponding region; and
determining, based on the key point depth information of the target object, whether the target object is a living body.

17. A non-transitory computer-readable storage medium, having computer program instructions stored thereon, wherein execution of the computer program instructions by a processor causes the processor to:
perform target object detection on a first image captured by a first image sensor in a binocular camera apparatus to obtain a first target region, and perform the target object detection on a second image captured by a second image sensor in the binocular camera apparatus to obtain a second target region;
determine whether the first target region as a whole is consistent with the second target region;
determine, in response to the first target region as a whole being inconsistent with the second target region, a key region in the first target region based on key point information of the first target region, wherein the key point information comprises position information of key points in the first target region;
determine a corresponding region of the first target region in the second image based on position information of the key region;
obtain key point depth information of a target object according to the first target region and the corresponding region; and
determine, based on the key point depth information of the target object, whether the target object is a living body.

* * * * *